United States Patent
Asai et al.

(10) Patent No.: US 7,105,971 B2
(45) Date of Patent: Sep. 12, 2006

(54) PERMANENT-MAGNET ROTOR FOR AN INNER ROTOR TYPE ELECTRIC ROTARY MACHINE AND MAGNET-SAVING TYPE ROTOR FOR A SYNCHRONOUS MOTOR

(75) Inventors: Jiro Asai, Okazaki (JP); Shinichi Ogawa, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/959,369

(22) Filed: Oct. 7, 2004

(65) Prior Publication Data

US 2005/0040723 A1  Feb. 24, 2005

Related U.S. Application Data

(62) Division of application No. 10/412,426, filed on Apr. 14, 2003, now abandoned.

(30) Foreign Application Priority Data

| Apr. 15, 2002 | (JP) | ............................. 2002-112389 |
| Dec. 18, 2002 | (JP) | ............................. 2002-366700 |
| Dec. 18, 2002 | (JP) | ............................. 2002-366717 |
| Jan. 31, 2003 | (JP) | ............................. 2003-024251 |

(51) Int. Cl.
*H02K 21/12* (2006.01)
*H02K 1/22* (2006.01)

(52) U.S. Cl. ............................. 310/156.53; 310/156.45

(58) Field of Classification Search ........... 310/156.53, 310/156.54–156.58, 156.78–156.84, 211, 310/156.43, 156.44, 156.45

See application file for complete search history.

(56) References Cited

U.S. PATENT DOCUMENTS

| 4,568,846 A | 2/1986 | Kapadia |
| 4,661,736 A | 4/1987 | Kawada et al. |
| 5,369,325 A | 11/1994 | Nagate et al. |
| 5,672,926 A * | 9/1997 | Brandes et al. ............. 310/181 |
| 5,679,995 A | 10/1997 | Nagate et al. |
| 5,811,904 A | 9/1998 | Tajima et al. |
| 5,864,191 A | 1/1999 | Nagate et al. |
| RE36,367 E * | 11/1999 | Nagate et al. ......... 310/156.54 |
| 5,978,061 A | 11/1999 | Miyazaki et al. |
| 6,208,054 B1 | 3/2001 | Tajima et al. |
| 6,268,677 B1 | 7/2001 | Takabatake et al. |
| 6,445,100 B1 * | 9/2002 | Tajima et al. ........... 310/156.57 |
| 6,445,437 B1 | 9/2002 | Miyazaki et al. |
| 6,486,581 B1 * | 11/2002 | Miyashita et al. ...... 310/156.53 |
| 6,703,744 B1 * | 3/2004 | Yoshinaga et al. ...... 310/156.45 |
| 6,774,523 B1 * | 8/2004 | Ahn et al. .................. 310/216 |
| 6,794,784 B1 * | 9/2004 | Takahashi et al. ...... 310/156.56 |
| 6,888,608 B1 | 5/2005 | Miyazaki et al. |
| 2002/0171309 A1 * | 11/2002 | Wakui et al. .......... 310/156.48 |

FOREIGN PATENT DOCUMENTS

EP  0013157  12/1979

(Continued)

*Primary Examiner*—Tran Nguyen
(74) *Attorney, Agent, or Firm*—Oliff & Berridge, PLC

(57) ABSTRACT

A total of three permanent magnets, installed in a rotor core closely to an outer cylindrical surface of the rotor core, are disposed at predetermined angular pitches in the circumferential direction of the rotor core. All of the permanent magnets are magnetized in such a manner that the direction of magnetization is the same when seen in the radial direction. A plurality of magnet-less holes, extending in the axial direction in the vicinity of the outer cylindrical surface of the rotor core, are provided between two adjacent permanent magnets.

16 Claims, 15 Drawing Sheets

FOREIGN PATENT DOCUMENTS

| | | |
|---|---|---|
| EP | 0 905 858 A1 | 3/1999 |
| EP | 0 917 272 A1 | 5/1999 |
| JP | B-S49-21525 | 6/1974 |
| JP | 3-54-148214 * | 5/1978 ................. 310/211 |
| JP | 354148214 | 11/1979 |
| JP | 57-186966 | 11/1982 |
| JP | U-60-69548 | 5/1985 |
| JP | A 60-121949 | 6/1985 |
| JP | U-64-47565 | 3/1989 |
| JP | 4-79741 | 3/1992 |
| JP | A 4-71342 | 3/1992 |
| JP | U-6-80367 | 11/1994 |
| JP | A 7-20050 | 4/1995 |
| JP | A 8-107639 | 4/1996 |
| JP | A-H09-074729 | 3/1997 |
| JP | A-10-164784 | 6/1998 |
| JP | A 10-174396 | 6/1998 |
| JP | 11-18328 | 1/1999 |
| JP | A-11-69676 | 3/1999 |
| JP | A 11-103546 | 4/1999 |
| JP | A 11-103547 | 4/1999 |
| JP | A 2000-14064 | 1/2000 |
| JP | A-2000-217287 | 8/2000 |
| JP | A-2002-101586 | 4/2002 |
| JP | B2 3308828 | 5/2002 |
| WO | WO 94/05075 | 3/1994 |

\* cited by examiner

PERMANENT-MAGNET ROTOR FOR AN INNER ROTOR TYPE ELECTRIC ROTARY MACHINE AND MAGNET-SAVING TYPE ROTOR FOR A SYNCHRONOUS MOTOR

This is a Divisional of application Ser. No. 10/412,426, filed Apr. 14, 2003 now abandoned. The entire disclosure of the prior application is hereby incorporated by reference herein in its entirety.

BACKGROUND OF THE INVENTION

1. Field of the Invention

The present invention relates to a permanent-magnet rotor for an inner rotor type electric rotary machine and a magnet-saving type rotor for a synchronous motor.

2. Description of the Background Art

The surface permanent-magnet motors (SPM) and the interior permanent-magnet motors (IPM) are two representative conventional synchronous machines using permanent-magnet rotors. The latter is advantageous in that mechanical support of the permanent magnets is easy and a reluctance torque can be obtained in addition to a magnetic rotor.

In the conventional IPM, permanent magnets are installed in a rotor core closely to an outer cylindrical surface thereof and disposed at equal pitches. The permanent magnets are magnetized to have alternate polarities in the circumferential direction.

Furthermore, switched reluctance motors (SRM) and synchronous reluctance motors (SYNRM) are also conventionally known as representative reluctance motors.

IPMs are widely used in industrial and automotive fields and are earnestly required, from various reasons, to reduce the size and weight as well as the manufacturing costs. Reducing the manufacturing costs will be easily attained by adopting the above-described reluctance motors (RM) or the IPMs using cheap ferrite magnets. However, the motor performance will deteriorate. The motor size will increase inevitably. This is not desirable especially for automotive motors, because the reduction in size and weight is an important factor for the automotive motors. Accordingly, adoption of the above-described reluctance motors (RM) or the ferrite magnet-based IPMs is not a preferable selection. In general, the residual magnetic flux density of ferrite magnets is small. To obtain a required amount of magnetic flux, it is definitely necessary to expand the size of the motor in the circumferential direction or in the axial direction. As a result, the motor size or weight increases inevitably.

In view of the foregoing, a preferable way to attain downsizing and weight-reduction of motors is adopting IPMs using rare-earth magnets because the rare-earth magnets have excellent residual magnetic flux density. However, the rare-earth materials are expensive. The required amount of magnets for each motor must be reduced.

To suppress the reduction of magnetic flux and to reduce the amount of magnets to be used, reducing the thickness of each magnet is effective. However, it is generally difficult to realize a thin magnet having the thickness less than approximately 2 mm from the restrictions in manufacturing processes of magnets and also from the requirements for assuring sufficient mechanical strength of magnets.

Furthermore, although the permanent magnets are installed into insertion holes of the rotor extending in the axial direction, this installation work is not easy in the case that the permanent magnets are magnetized beforehand. Accordingly, the usual procedure for installing the permanent magnets into the insertion holes is carried out by inserting non-magnetized permanent magnets into the insertion holes and then magnetizing the whole of rotor. However, according to the conventional rotors, the permanent magnets are provided near the outer cylindrical surface of the rotor core and magnetized to have alternate polarities in the circumferential direction. It is hence necessary to dispose the magnetizing magnetic poles on an inner cylindrical surface facing to the outer cylindrical surface of the rotor core so as to have alternate polarities in the circumferential direction. Accordingly, the magnetizing magnetic flux in the rotor core formed by the magnetizing magnetic poles passes the rotor core region intervening between adjacent permanent magnets and, as a result, bypasses the permanent magnets. This makes it difficult to uniformly magnetize the permanent magnets in the radial direction. Furthermore, the structure of a required magnetizing apparatus will become complicated.

SUMMARY OF THE INVENTION

In view of the above-described problems of the prior art, the present invention has an object to provide a permanent-magnet rotor for an inner rotor type electric rotary machine which is easy to magnetize and is capable of suppressing increase of motor size and weight in the case that the permanent magnets are installed closely to the outer cylindrical surface of the rotor core.

To accomplish the above and other related objects, the present invention provides a permanent-magnet rotor for an inner rotor type electric rotary machine including a rotor core having an outer cylindrical surface facing to an inner cylindrical surface of a stator, and a plurality of permanent magnets installed in the rotor core closely to the outer cylindrical surface of the rotor core and disposed at predetermined angular pitches in the circumferential direction of the rotor core, wherein all of the permanent magnets are magnetized in such a manner that the direction of magnetization is the same when seen in the radial direction.

With this arrangement, it becomes possible to provide a permanent-magnet rotor for an inner rotor type electric rotary machine which is easy to magnetize and is capable of suppressing increase of motor size and weight in the case that the permanent magnets are installed closely to the outer cylindrical surface of the rotor core.

According to a preferred embodiment, the above-described permanent magnets are rare-earth magnet.

More specifically, to decrease manufacturing costs, selecting cheaper magnet material or adopting no magnets is preferable. However, this is not practical in the case that the motor size or motor weight is limited or restricted. The rare-earth magnet is excellent in its magnetic flux density. However, due to fragility, it is difficult to reduce the thickness of rare-earth magnets for the purpose of reducing the amount of magnets to be used. From manufacturing restrictions, the limit in reducing the thickness of rare-earth magnets is approximately 2 mm.

According to the conventional inner rotor type electric rotary machine, in the magnetic circuit formed by the permanent magnets, two adjacent permanent magnets are overlapped in series on the magnetic path. An effective or valid magnet flux amount decreases by a certain amount due to leakage of magnetic flux. It is however regarded, in an ideal case, that two adjacent permanent magnets are equivalent to a single permanent magnet having a double thickness.

The present invention utilizes the above-described phenomenon. All of the permanent magnets installed closely to the outer cylindrical surface of the rotor core are magnetized in such a manner that the direction of magnetization is the same when seen in the radial direction. Furthermore, an inter-magnet outer peripheral region intervenes between two adjacent permanent magnets arrayed in the circumferential direction and located closely to the outer cylindrical surface of the rotor core. The inter-magnet outer peripheral region is magnetized to have a polarity opposed to the polarity of a magnet-neighboring outer peripheral regions positioned at the radial outer side of respective permanent magnets.

With this arrangement, the amount of used magnets can be reduced to a half level without substantially reducing the magnet flux amount. The manufacturing cost of the inner rotor type electric rotary machine can be greatly reduced.

Furthermore, according to the permanent-magnet rotor of this invention, the magnetizing apparatus is only required to magnetize the permanent-magnet rotor in the radial direction with the same direction of magnetization along its entire cylindrical surface. Hence, the arrangement of the required magnetizing apparatus becomes simple compared with the conventional magnetizing apparatus. Furthermore, it is possible to reduce the leakage of magnetizing flux. This is advantageous in realizing downsizing and cost reduction of the magnetizing apparatus. The manufacturing cost for an inner rotor type electric rotary machine can be further reduced.

Furthermore, according to the permanent-magnet rotor of this invention, a portion of the rotor core provided with no permanent magnets can be effectively used as a magnetic path. The reluctance torque generating flux $\Phi q$ (i.e., flux formed by the q-axis current) passing across this region can be increased. As a result, the reluctance torque can be increased.

Furthermore, reduction in the number of required magnets leads to improvement in the mechanical strength of the permanent-magnet rotor.

According to a preferable embodiment of the present invention, the rotor core has a plurality of magnet-less holes extending in the axial direction in the vicinity of the outer cylindrical surface of the rotor core so as to interpose between two adjacent permanent magnets. The magnet-less holes can be formed so as to communicate with the outer cylindrical surface of the rotor core.

With this arrangement, it becomes possible to eliminate adverse influence, such as increase of armature reaction, caused when the number of magnet insertion holes is reduced. The weight of the rotor core can be reduced.

More specifically, the magnet-less holes are positioned in the inter-magnet outer peripheral region of the rotor core located between two adjacent magnets which are arrayed in the circumferential direction and magnetized with the same direction of magnetization when seen in the radial direction.

No magnet insertion holes are provided in the inter-magnet outer peripheral region. The magnet fluxes formed by permanent magnets positioned at both circumferential ends can smoothly flow or pass across this region. The current flux formed by the armature current can smoothly flow or pass across this region in the circumferential direction. Part of this current flux, i.e., q-axis current flux, is effectively used to generate a reluctance torque as a result of an electromagnetic interaction with a d-axis current. In other words, some component of this current flux does not contribute the electromagnetic interaction with the d-axis current and increases the invalid or reactive inductance and also increases the loss. Such invalid or reactive inductance and the loss can be reduced by providing the above-described magnet-less holes in accordance with the preferred embodiment of the present invention.

According to the preferred embodiment of the present invention, the magnet-less hole has an elongated cross-sectional shape with a radial size longer than a circumferential size. This arrangement is advantageous in further reducing the above-described adverse influence brought by the armature reaction while suppressing the reduction of magnet flux.

According to a preferred embodiment of the present invention, the magnet-less hole accommodate a basket-type wiring. This is effective in suppressing the generation of induction torque and also in preventing the motor from going into a disordered or non-synchronous condition. It becomes possible to suppress reduction of a magnetic path cross-sectional, area of the magnet flux in the rotor core. The basket-type wiring brings the effect of enhancing the fastening strength of multilayered electromagnetic steel plates constituting the rotor core.

Furthermore, according to a preferred embodiment of the present invention, the above-described magnet-less holes are arrayed in a predetermined matrix pattern with a plurality of lines and rows extending in the circumferential direction and the radial direction. This arrangement is advantageous in securing both the magnetic path for passing the magnet fluxes and the magnetic path for passing the q-axis current fluxes.

According to this arrangement, the magnet insertion holes not contributing the increase of the q-axis current fluxes necessary to generate the reluctance torque can be removed. As a result, the axis current fluxes can be increased without reducing the magnet flux amount.

Furthermore, the present invention has an object to provide a magnet-saving type rotor for a synchronous motor which has excellent output characteristics.

To accomplish the above and other related objects, the present invention provides a first magnet-saving type rotor for a synchronous motor including a rotor core, and a total of k permanent magnets installed in the rotor core closely to an outer cylindrical surface of the rotor core. A total of k magnet accommodation holes are formed in the rotor core for separately accommodating the permanent magnets. The magnet accommodation holes, extending in an axial direction of the rotor core, are disposed at equal angular pitches of $\theta n$ (=360/k degrees). A total of 2 k magnet-less holes are formed in the rotor core for accommodating no permanent magnets. The magnet-less holes, extending in the axial direction of the rotor core, are positioned at both circumferential ends of the k magnet accommodation holes. A plurality of first magnetic pole portions, having a first polarity, are provided at the radial outer side of respective magnet accommodation holes in the outer peripheral region of the rotor core. A plurality of second magnetic pole portions, having a second polarity, are provided between any two of the magnet-less holes arrayed next to each other along the circumferential direction in the outer peripheral region of the rotor core.

According to the first magnet-saving type rotor of the present invention, a sector angle occupied by each of the magnet-less holes positioned at both circumferential ends of respective magnet accommodation holes is equal to $\theta 0$ (=0.5($\theta n - \theta 1 - \theta 2$)), where $\theta 1$ represents a sector angle occupied by each of the first magnetic pole portions, $\theta 2$ represents a sector angle occupied by each of the second magnetic pole portions, and $\theta 0$ represents a sector angle occupied by each of boundary zones intervening between the first magnetic pole portions and the second magnetic pole portions.

According to the arrangement of the above-described first magnet-saving type rotor for a synchronous motor, the magnet-less holes positioned at both circumferential ends of respective magnet accommodation holes are continuously formed with each magnet accommodation hole so that no core portion is provided between the magnet-less holes and the associated magnet accommodation holes. Leakage of magnetic flux can be suppressed. The torque can be increased. The symmetry in the distribution of magnetic flux along the circumferential direction of the rotor core can be improved and, accordingly, the toque ripple can be reduced.

According to a preferred embodiment of the present invention, a ratio ($\theta 0/\theta n$) of the sector angle $\theta 0$ to the pitch angle $\theta n$ is in the range from 0.05 to 0.125.

The experimental data obtained by the inventors demonstrate the effect that this setting can increase the average magnetic flux density, i.e., effective or valid magnetic flux, in a stator/rotor gap (i.e., the gap between the stator and the rotor).

According to the assumption by the inventors, when the ratio ($\theta 0/\theta n$) is too much larger than the above-described range, the sector angles of the first and second magnetic pole portions become so small and accordingly the average magnetic flux density, i.e., effective or valid magnetic flux, decreases. On the other hand, when the ratio ($\theta 0/\theta n$) is too much smaller than the above-described range, the magnetic resistance of a magnetic path passing near the magnet-less hole in the second magnetic pole portion becomes fairly small compared with the magnetic resistance of a magnetic path passing far from the magnet-less hole. As a result, the uniformity in the distribution of magnetic flux in the second magnetic pole portion becomes worse. This is the reason why the average magnetic flux density, i.e., effective or valid magnetic flux, decreases. The reduction of effective or valid magnetic flux directly leads to reduction of motor output.

According to the preferred embodiment of the present invention, a ratio ($\theta 2/\theta 1$) of the sector angle $\theta 2$ to the sector angle $\theta 1$ is in the range from 0.9 to 1.1.

The experimental data obtained by the inventors demonstrate the effect that this setting can increase the average magnetic flux density, i.e., effective or valid magnetic flux, in the stator/rotor gap.

According to the preferred embodiment of the present invention, the permanent magnets are made of rare-earth magnet. The rare-earth magnet has a large residual magnetic flux which is advantageous in obtaining higher motor output.

According to the magnet-saving type motor of this invention, a magnet circuit is formed via the route of the first magnetic pole portion, the stator/rotor gap, the stator core, the stator/rotor gap, the second magnetic pole portion, and the first magnetic pole portion. In this magnet circuit, only one permanent magnet is provided as a field flux source. It is easy to install thicker permanent magnets compared with those of the conventional rotors. Increasing the thickness of the permanent magnets compensates the drawback of the rare-earth magnet (i.e., fragility). Hence, the magnet-saving type motor of this invention can be preferably employed in a high-speed electric rotary machine.

Furthermore, the present invention has an object to provide another magnet-saving type rotor for a synchronous motor which has excellent output characteristics.

To accomplish the above and other related objects, the present invention provides a second magnet-saving type rotor for a synchronous motor including a rotor core, including a rotor core, and a total of k permanent magnets installed in the rotor core closely to an outer cylindrical surface of the rotor core. A total of k magnet accommodation holes are formed in the rotor core for separately accommodating the permanent magnets. The magnet accommodation holes, extending in the axial direction of the rotor core, are disposed at equal angular pitches of $\theta n$ (=360/k degrees). A total of 2 k magnet-less holes are formed in the rotor core for accommodating no permanent magnets. The magnet-less holes, extending in the axial direction of the rotor core, are positioned at both circumferential ends of k magnet accommodation holes. A total of k first magnetic pole portions, having a first polarity, are positioned at the radial outer side of the magnet accommodation holes in the outer peripheral region of the rotor core. A total of k second magnetic pole portions, having a second polarity, are positioned between any two of the magnet-less holes arrayed next to each other along the circumferential direction in the outer peripheral region of the rotor core.

According to the second magnet-saving type rotor of the present invention, a ratio ($\theta 2/\theta 1$) of a sector angle $\theta 2$ occupied by each of the second magnetic pole portions to a sector angle $\theta 1$ occupied by each of the first magnetic pole portions is in a range from 0.9 to 1.1, and a sector angle $\theta 0$ occupied by each of boundary zones intervening between the first magnetic pole portions and the second magnetic pole portions is expressed by $0.5(\theta n-\theta 1-\theta 2)$.

The experimental data obtained by the inventors demonstrate the effect that this setting can increase the average magnetic flux density, i.e., effective or valid magnetic flux, in the stator/rotor gap.

According to a preferable embodiment of the present invention, the sector angle $\theta 0$ is equal to a sector angle occupied by each of the magnet-less holes positioned at both circumferential ends of respective magnet accommodation holes.

According to this arrangement, the magnet-less holes positioned at both circumferential ends of respective magnet accommodation holes are continuously formed with the associated magnet accommodation holes so that no core portion is provided between the magnet-less holes and the associated magnet accommodation holes. Leakage of magnetic flux can be suppressed. The torque can be increased. The symmetry in the distribution of magnetic flux along the circumferential direction of the rotor core can be improved and, accordingly, the toque ripple can be reduced.

According to a preferred embodiment of the present invention, a ratio ($\theta 0/\theta n$) of the sector angle $\theta 0$ to the pitch angle $\theta n$ is in the range from 0.05 to 0.125.

The experimental data obtained by the inventors demonstrate the effect that this setting can increase the average magnetic flux density, i.e., effective or valid magnetic flux, in a stator/rotor gap (i.e., the gap between the stator and the rotor).

According to the assumption by the inventors, when the ratio ($\theta 0/\theta n$) is too much larger than the above-described range, the sector angles of the first and second magnetic pole portions become so small and accordingly the average magnetic flux density, i.e., effective or valid magnetic flux, decreases. On the other hand, when the ratio ($\theta 0/\theta n$) is too much smaller than the above-described range, the magnetic resistance of a magnetic path passing near the magnet-less hole in the second magnetic pole portion becomes fairly small compared with the magnetic resistance of a magnetic path passing far from the magnet-less hole. As a result, the uniformity in the distribution of magnetic flux in the second magnetic pole portion becomes worse. This is the reason why the average magnetic flux density, i.e., effective or valid magnetic flux, decreases. The reduction of effective or valid magnetic flux directly leads to reduction of motor output.

According to the preferred embodiment of the present invention, the permanent magnets are made of rare-earth magnet. The rare-earth magnet has a large residual magnetic flux which is advantageous in obtaining higher motor output.

According to the magnet-saving type motor of this invention, a magnet circuit is formed via the route of the first magnetic pole portion, the stator/rotor gap, the stator core, the stator/rotor gap, the second magnetic pole portion, and the first magnetic pole portion. In this magnet circuit, only one permanent magnet is provided as a field flux source. It is easy to install thicker permanent magnets compared with those of the conventional rotors. Increasing the thickness of the permanent magnets compensates the drawback of the rare-earth magnet (i.e., fragility). Hence, the magnet-saving type motor of this invention can be preferably employed in a high-speed electric rotary machine.

Furthermore, the present invention has an object to provide another magnet-saving type rotor for a synchronous motor which is capable of suppressing the magnetic flux from leaking via bridges between magnet-less holes and the outer cylindrical surface of the rotor core.

To accomplish the above and other related objects, the present invention provides a third magnet-saving type rotor for a synchronous motor including a rotor core and a total of k permanent magnets installed in the rotor core closely to an outer cylindrical surface of the rotor core. A total of k magnet accommodation holes are formed in the rotor core for separately accommodating the permanent magnets. The magnet accommodation holes, extending in the axial direction of the rotor core, are disposed at equal angular pitches of θn (=360/k degrees). A total of 2 k magnet-less holes are formed in the rotor core for accommodating no permanent magnets. Two magnet-less holes, extending in the axial direction of the rotor core, are formed continuously at both circumferential ends of each of k magnet accommodation holes. A total of k first magnetic pole portions, having a first polarity, are positioned at the radial outer side of the magnet accommodation holes in the outer peripheral region of the rotor core. A total of k second magnetic pole portions, having a second polarity, are positioned between any two of the magnet-less holes arrayed next to each other along the circumferential direction in the outer peripheral region of the rotor core. A pair of bridges is provided between an outer cylindrical surface of the rotor core and the magnet-less holes positioned at both circumferential ends of each magnet accommodation hole. According to the third magnet-saving type rotor of the present invention, a ratio of the thickness, of each bridge to a gap between the rotor core and a stator constituting part of the synchronous motor is in the range from 0.5 to 3.

The above-described arrangement of the third magnet-saving type rotor of the present invention is effective to prevent the magnetic flux from leaking via the bridges.

According to a preferred embodiment of the present invention, each of the bridges has a uniform thickness in the circumferential direction and a magnetic flux in each bridge is saturated.

Furthermore, according to the preferred embodiment of the present invention, the cross-sectional shape of each of the magnet-less holes is a right triangular shape with a hypotenuse extending along the outer cylindrical surface of the rotor core.

Furthermore, according to the preferred embodiment of the present invention, a circumferential size of the first magnetic pole portion is larger than a circumferential size of the second magnetic pole portion.

BRIEF DESCRIPTION OF THE DRAWINGS

These and other objects, features, aspects and advantages of the present invention will become more apparent from the following detailed description of the present invention which is to be read in conjunction with the accompanying drawings, in which.

DESCRIPTION OF THE PREFERRED EMBODIMENTS

First Embodiment

Figure 1:
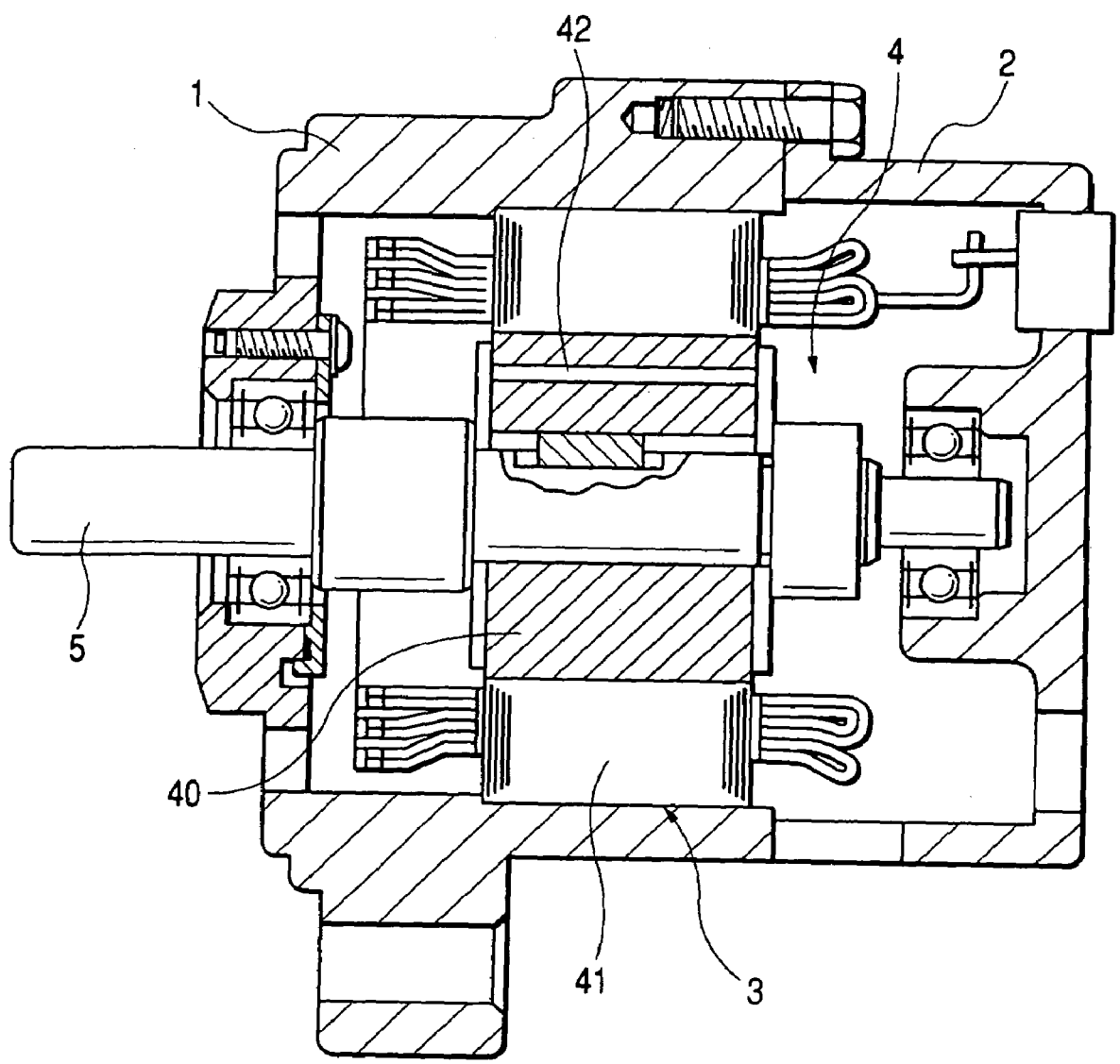
FIG. 1 is a cross-sectional view showing an IPM in accordance with a first embodiment of the present invention, taken along a plane including an axis of IPM.

FIG. 1 shows an inner rotor type IPM constituting a 6-pole three-phase synchronous motor.

A front housing 1 and a rear housing 2 are connected securely with tightening bolts. A stator 3 is fixed on an inner cylindrical surface of the front housing 1. A rotor 4 is accommodated at a radial inner side of the stator 3. The rotor 4 is securely fixed around a rotor shaft 5. The rotor shaft 5 is supported by the housings 1 and 2 via bearings. The rotor 4 includes a rotor core 40 made of multilayered electromagnetic steel plates and permanent magnets 42 installed in magnet insertion holes 41 of this rotor core 40.

Figure 2:
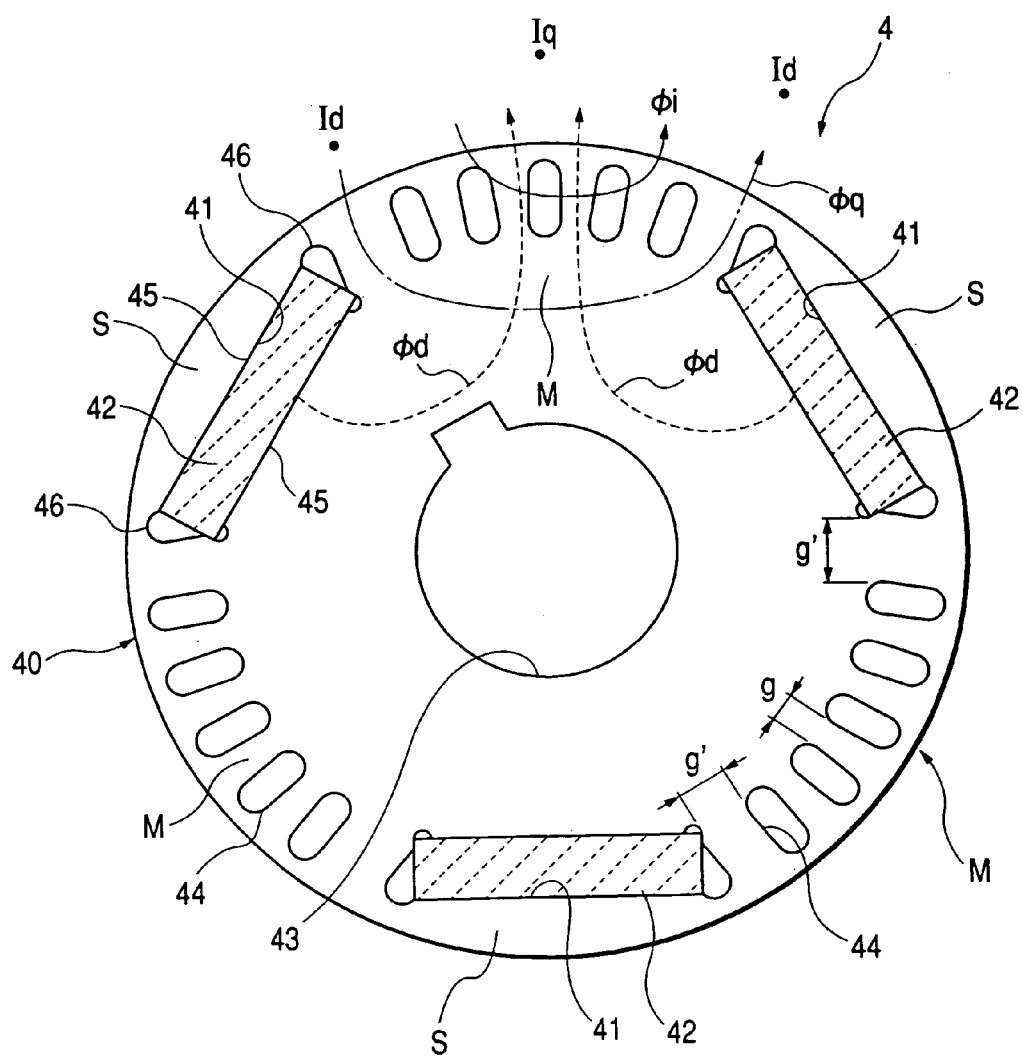
FIG. 2 is a cross-sectional view showing a permanent-magnet rotor shown in FIG. 1, taken along a plane normal to the axis of IPM.

FIG. 2 is a cross-sectional view of the rotor 4 taken along a plane normal to the axis of the rotor 4, although a hatching showing the cross section of rotor core 40 is omitted. In addition to the above-described magnet insertion holes 41, the rotor core 40 has a rotary shaft hole 43 extending in the axial direction into which the rotor shaft 5 is inserted by press-fitting.

A total of three magnet insertion holes 41 are positioned closely to the outer cylindrical surface of the rotor core 40 and disposed symmetrically about the rotation center. It is needless to say that the total number of magnet insertion holes 41 and the permanent magnets 42 is not limited to 3 and, therefore, can be reduced or increased to 1, 2, 4, or others.

The cross section of each magnet insertion hole 41, taken along the plane normal to the axis of the rotor 4, is a rectangular shape elongated in the direction normal to the radial direction of the rotor core 40. The cross section of respective magnet insertion holes 41 has two principal planes 45 and 45 which are normal to the radial direction of the rotor core 40. A protruding bore 46, formed at two radial outer ends of respective magnet insertion holes 41, suppresses the leakage of magnetic flux of the permanent magnets 42. The permanent magnets 42, made of rare-earth magnet, are configured into a flat plate shape and are magnetized in such a manner that the direction of magnetization is the same when seen in the radial direction.

More specifically, the radial outer surfaces of respective permanent magnets 42, facing to the radial outer principal planes 45 of respective magnet insertion holes 41, have the same polarity (e.g., either of S-pole and N-pole). On the other hand, the radial inner surfaces of respective permanent magnets 42, facing to the radial inner principal planes 45 of respective magnet insertion holes 41, have a different polarity (e.g., the other of S-pole and N-pole).

The above-described IPM has the following characteristics.

According to this embodiment, each permanent magnet 42 is magnetized in such a manner that the direction of magnetization is the same when seen in the radial direction. With this arrangement, the magnetic poles possessing the same polarity are formed in the magnet insertion holes 41 as well as in magnet-neighboring outer peripheral regions S, i.e., regions adjacent to the outer cylindrical surface of the rotor core 40, positioned at the radial outer side of respective magnet insertion holes 41. On the other hand, the magnetic poles having the opposite polarity are formed in inter-magnet outer peripheral regions M intervening between adjacent permanent magnets 42 and located closely to the outer cylindrical surface of the rotor core 40. As shown in FIG. 2, magnet fluxes $\Phi d$ are formed in the direction indicated by dotted lines ranging from the magnet-neighboring outer peripheral regions S to the inter-magnet outer peripheral region M intervening between them. The magnet fluxes $\Phi d$ and a q-axis current Iq cooperatively produce a magnet torque. Meanwhile, as shown in FIG. 2, the q-axis current Iq forms a q-axis current flux $\Phi q$ as indicated by an alternate long and short dash line. The q-axis current flux $\Phi q$ and a d-axis current Id cooperatively produce a reluctance torque.

According to this embodiment, a total of five vacant holes (i.e., magnet-less holes) 44 are formed closely to the outer cylindrical surface of the rotor core 40 so as to be arrayed in the circumferential direction in each inter-magnet outer peripheral region M ranging between two adjacent permanent magnets 42 and 42, while the permanent magnets 42 and 42 are magnetized in such a manner that the direction of magnetization is the same when seen in the radial direction. A predetermined gap g is provided between two adjacent vacant holes 44. The cross section of respective vacant holes 44 is an elongated shape extending in the radial direction, with a radial size longer than a circumferential size.

Respective vacant holes 44 extend in the axial direction of the rotor core 40. A gap g' is provided between the vacant hole 44 and the protruding bore 46. The gap g' is larger than the above-described gap g. The vacant holes 44 are provided closely to the outer cylindrical surface. This arrangement effectively suppresses the reduction of q-axis current flux $\Phi q$ which is necessary to produce the reluctance torque. The vacant holes 44 have the function of reducing an invalid or reactive flux $\Phi i$, indicated by a solid line, and also reducing leakage inductance, iron or core loss, and armature reaction. It is needless to say that the number of vacant holes 44 and the cross-sectional configuration of respective holes 44 can be modified in various ways.

As described above, the holes of this embodiment should be non-magnetic portions having the capability of not only suppressing the reduction of q-axis current flux $\Phi q$ but also reducing the invalid or reactive flux $\Phi i$. In this respect, it is preferable to open the holes extending across the multilayered electromagnetic steel plates and then fill the holes with non-magnetic material. Alternatively, it is preferable to process or machine a plate member equipped with non-magnetic portions into a disk shape and laminate a plurality of disks into the rotor core.

The above-described inner rotor type IPM has the following effects.

First of all, it is possible to reduce the amount of magnets required for obtaining a higher flux density without reducing the thickness of employed rare-earth magnets. The manufacturing costs can be reduced. Reducing the number of magnets generally results in reduction of effective or valid magnet flux. However, the reduction of effective or valid magnet flux is not so serious and can be compensated by slightly increasing the motor size and weight for attaining the same output level compared with the conventional IPM. As a whole, in generating the same output, the cost required for manufacturing the above-described IPM of this embodiment is lower than that required for a convention rare-earth magnet based IPM. Furthermore, when compared with the conventional reluctance motors using no magnets, the above-described IPM of this embodiment is advantageous in that the motor size and weight can be greatly reduced.

Furthermore, according to the permanent-magnet rotor of this embodiment, the magnetizing apparatus is only required to magnetize the permanent-magnet rotor in the radial direction with the same direction of magnetization along its entire cylindrical surface. Hence, the arrangement of the required magnetizing apparatus becomes simple compared with the conventional magnetizing apparatus. Furthermore, it is possible to reduce the leakage of magnetizing flux. This is advantageous in realizing downsizing and cost reduction of the magnetizing apparatus. The manufacturing cost for an inner rotor type electric rotary machine can be further reduced.

Furthermore, according to the permanent-magnet rotor of this embodiment, a portion of the rotor core 40 provided with no permanent magnets can be effectively used as a magnetic path. The reluctance torque generating flux Φq (i.e., flux formed by the q-axis current) passing across this region can be increased. As a result, the reluctance torque can be increased.

Furthermore, reduction in the number of required magnets leads to improvement in the mechanical strength of the permanent-magnet rotor. The number of magnetic insertion holes 41 decreases due to provision of the vacant holes 44. This is effective to suppress the weight increase of the motor.

Second Embodiment

A second embodiment of the present invention is different from the above-described embodiment only in that the vacant holes 44 are provided with a basket type wiring formed by aluminum die-cast. This makes it possible to suppress the generation of induction torque and prevent the motor from going into a disordered or non-synchronous condition. Although, additionally providing the basket type wiring is conventionally known, there was severe spatial restriction in installing this kind of wiring because an available space is limited to a narrow region between the magnet insertion holes 41 and the outer cylindrical surface of the rotor core 40. The magnet path resistance of the magnet flux was large. On the other hand, according to this embodiment, the basket type wiring is easily installed in a wide region where the magnet insertion holes 41 are omitted. Thus, this embodiment solves the conventional problem.

Third Embodiment

Figure 3:
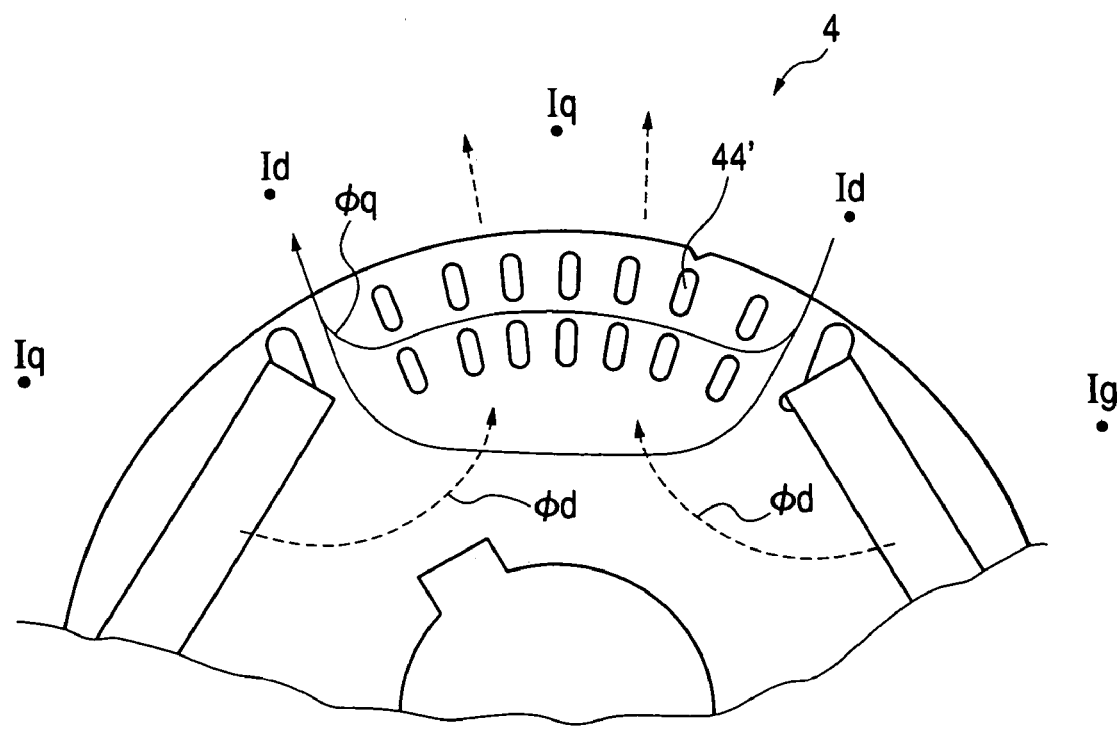
FIG. 3 is a cross-sectional view showing a modified permanent-magnet rotor in accordance with a third embodiment of the present invention.

FIG. 3 shows a modified permanent-magnet rotor in accordance with a third embodiment of the present invention. According to this embodiment, vacant holes 44' are arrayed in a predetermined matrix pattern with two lines extending in the radial direction and seven rows extending in the circumferential direction of the rotor core 40. Respective vacant holes 44' extend in the axial direction of the rotor core 40. With this arrangement, both the magnetic path for passing the magnet fluxes Φd and the magnetic path for passing the q-axis current fluxes Φq can be adequately formed. The magnet fluxes Φd is indicated by dotted lines. The q-axis current fluxes Φq, producing the reluctance torque, is indicated by solid lines.

The rest of the third embodiment is the same as that of the first embodiment.

Fourth Embodiment

A magnet-saving type rotor for a synchronous motor in accordance with a fourth embodiment will be explained with reference to FIG. 4.

Figure 4:
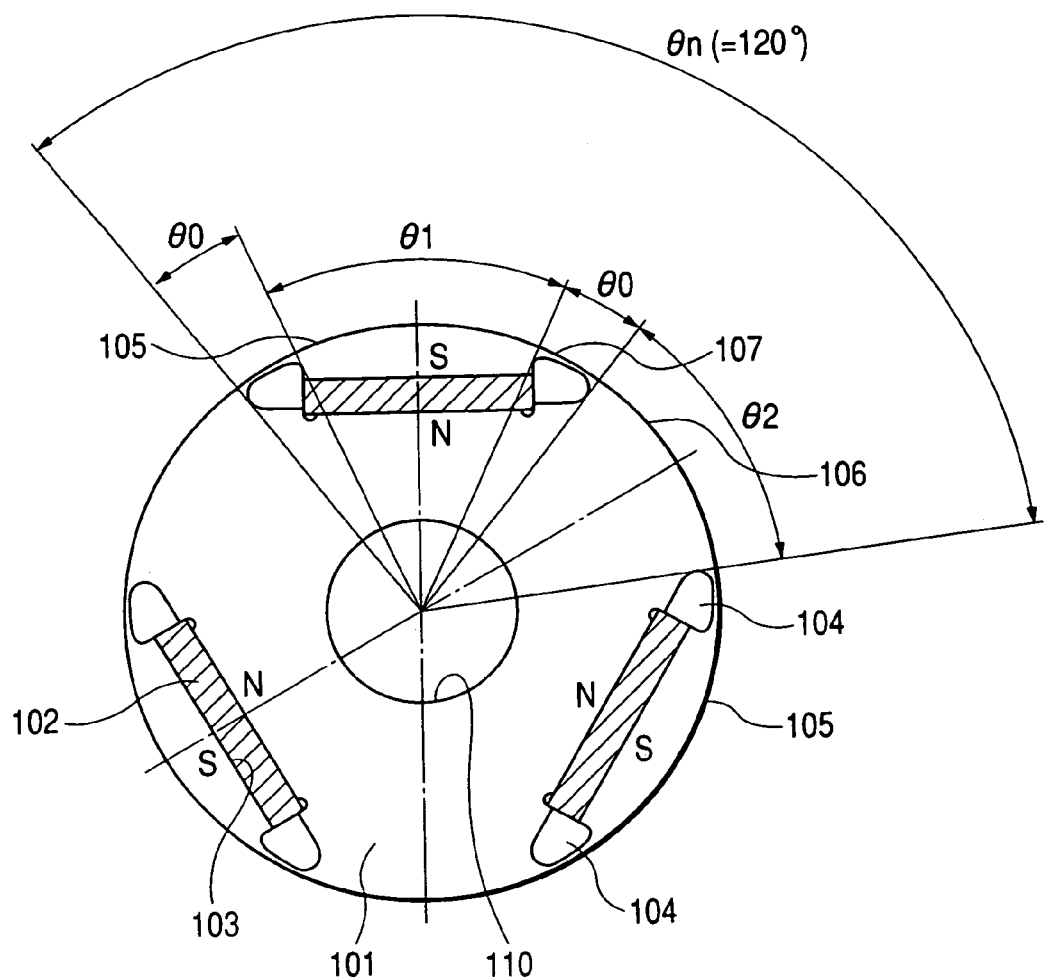
FIG. 4 is a cross-sectional view showing a magnet-saving type rotor in accordance with a fourth embodiment of the present invention.

The magnet-saving type rotor shown in FIG. 4 includes a rotor core 101 made of soft iron and a total of three permanent magnets 102 made of rare-earth magnet. The rotor core 101 includes the same number of (i.e., three) permanent magnet accommodation holes 103 for separately accommodating the permanent magnets 102. Respective permanent magnet accommodation holes 103 extend in an axial direction of the rotor core 101 and are disposed at equal angular pitches of 120°. Furthermore, the rotor core 101 includes a total of six vacant holes (i.e., magnet-less holes) 104 for accommodating no permanent magnets. Respective vacant holes 104 extend in the axial direction of the rotor core 101 and are positioned continuously at both circumferential ends of respective magnet accommodation holes 103. The vacant holes 104 are continuously or integrally formed with the associated magnet accommodation holes 103 so that no core portion is provided between the vacant holes 104 and the magnet accommodation holes 103.

A first magnetic pole portion 105, having a first polarity, is positioned at the radial outer side of each magnet accommodation hole 103 in an outer peripheral region of the rotor core 101. The first polarity (e.g., S-pole) is given or formed by the permanent magnet 102 installed in the magnet accommodation hole 103. A second magnetic pole portion 106, having a second polarity (e.g., N-pole), is positioned with no permanent magnets between any two vacant holes 104 arrayed next to each other along the circumferential direction in the outer peripheral region of the rotor core 101. A plurality of boundary zones 107 are provided between the first magnetic pole portions 105 and the second magnetic pole portions 106.

According to the arrangement shown in FIG. 4, a two-pole pitch angle θn is equal to a sum of a sector angle θ1 occupied by the first magnetic pole portion 105, a sector angle θ2 occupied by the second magnetic pole portion 106, and two times a sector angle θ0 occupied by the boundary zone 107. All of the sector angle θ0 is substantially occupied by the vacant hole 104 located in the boundary zone 107. In this embodiment, each sector angle is defined as a central angle of any sector formed about the axial center of rotor core 101 (i.e., the axial center of a rotary shaft hole 110 into which a rotor shaft is inserted by press-fitting).

The permanent magnets 102 of this embodiment are made of rare-earth magnet. The sector angle θ1 occupied by the first magnetic pole portion 105 is equal to the sector angle θ2 occupied by the second magnetic pole portion 106. Furthermore, a ratio (θ0/θn) of the sector angle θ0 occupied by each vacant hole 104 to the two-pole pitch angle θn is 0.065.

As shown in FIG. 4, each permanent magnet 102 has a flat rectangular shape with four corners. The sector angle θ1 is an angle formed between two lines originating from the axial center of rotor core 101 and passing two radial outer corners of the rectangular permanent magnet 102. The clearance, provided between the vacant hole 104 and the outer cylindrical surface of the rotor core 101, is formed as thin as possible within the restrictions for assuring sufficient mechanical strength for the rotor core 101.

The sector angle θ2 is an angle formed between two lines originating from the axial center of rotor core 101 and passing the edges of vacant holes 104 positioned in the boundary zones 107.

According to the above-described permanent-magnet rotor for an inner rotor type electric rotary machine, the magnetic flux density in the stator/rotor gap can be improved. The motor output is increased.

Figure 5:
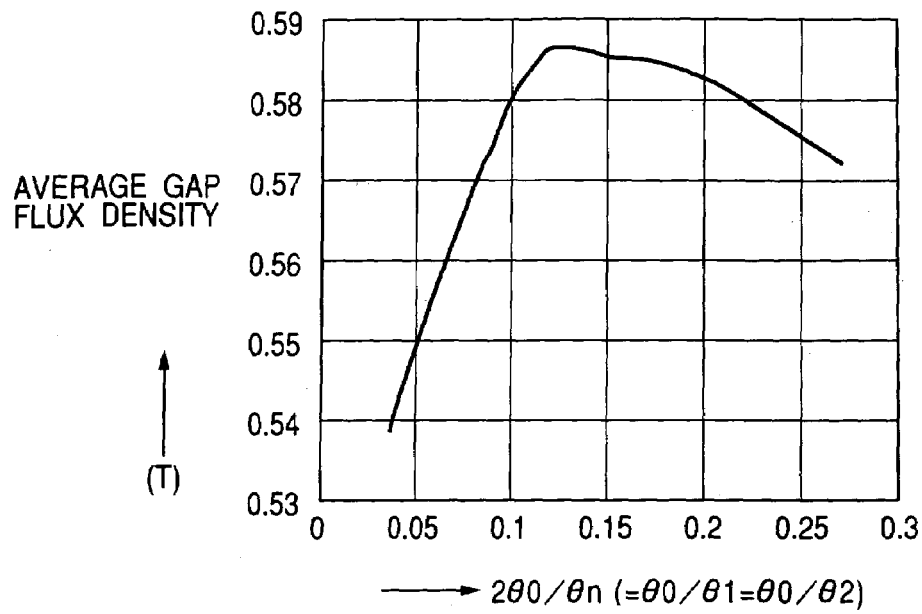
FIG. 5 is a graph showing test data with respect to the average magnetic flux density in the stator/rotor gap obtained when the sector angle of vacant holes is variously changed, in accordance with the fourth embodiment of the present invention.
Figure 6:
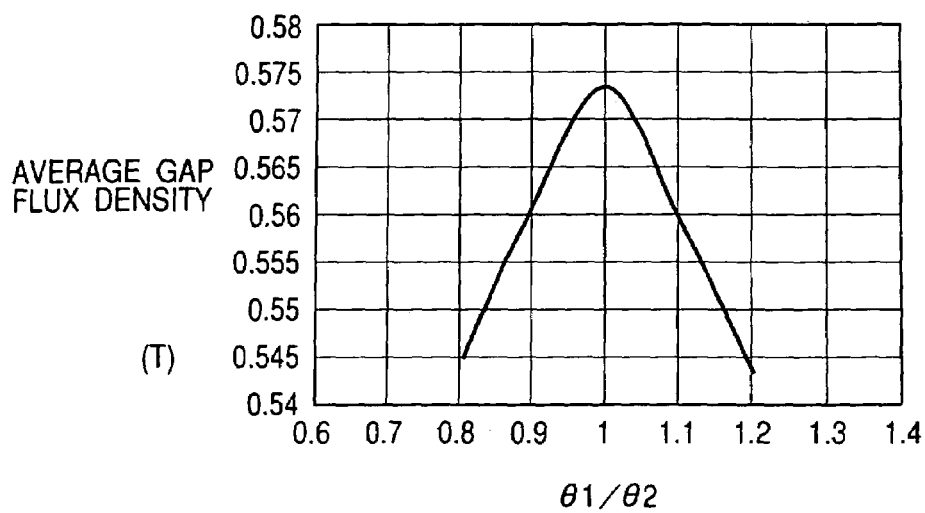
FIG. 6 is a graph showing test data with respect to the average magnetic flux density in the stator/rotor gap obtained when the ratio of first magnetic pole portions to second magnetic pole portions is variously changed, in accordance with the fourth embodiment of the present invention.

FIGS. 5 and 6 show test data. The tested rotor has the shape shown in FIG. 4. The outer diameter of rotor core 101 is 50 mm, and the inner diameter of rotor core 101 is 16 mm.

FIG. 5 shows the average magnetic flux density in the stator/rotor gap obtained when the sector angle $\theta 0$ of the vacant hole 104 is variously changed under the condition that the sector angle $\theta 1$ of the first magnetic pole portion 105 is equal to the sector angle $\theta 2$ of the second magnetic pole portion 106. As apparent from FIG. 5, to obtain excellent magnetic flux density, it is desirable that the ratio $2\theta 0/\theta n$ is in the range from 0.1 to 0.25.

FIG. 6 shows the average magnetic flux density in the stator/rotor gap obtained when the ratio $\theta 1/\theta 2$ is variously changed under the condition that the ratio $2\theta 0/\theta n$ is fixed to 0.125. As apparent from FIG. 6, to obtain excellent magnetic flux density, it is desirable that the ratio $\theta 1/\theta 2$ is in the range from 0.9 to 1.1.

Figure 7:
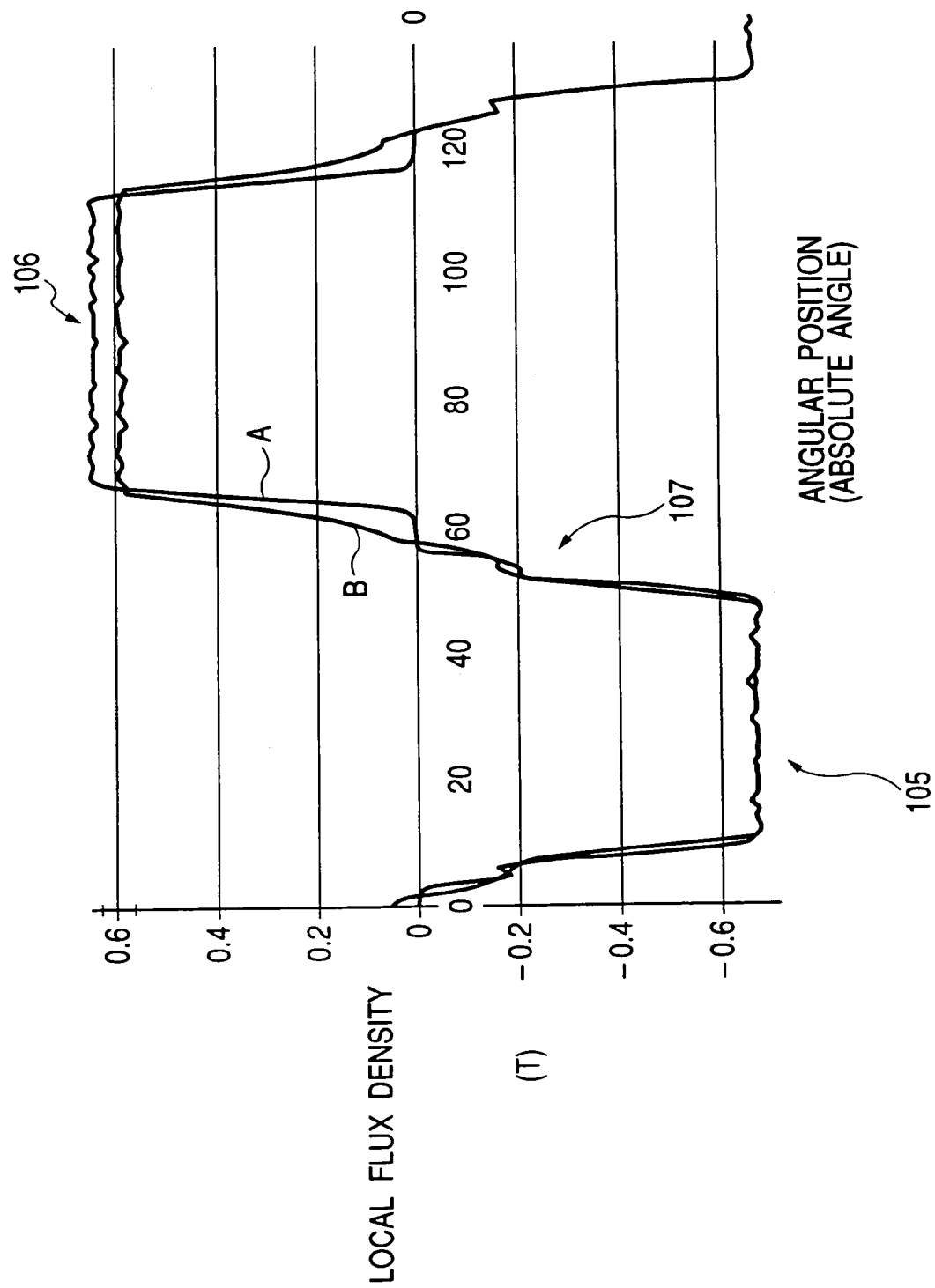
FIG. 7 is a view showing the circumferential distribution of the magnetic flux density in the stator/rotor gap in the case of providing vacant holes and also in the case of providing no vacant holes, in accordance with the fourth embodiment of the present invention.

FIG. 7 shows the circumferential distribution of the magnetic flux density in the stator/rotor gap in the case that the vacant holes 104 are provided under the condition that the ratio $2\theta 0/\theta n$ is 0.125 and the ratio $\theta 1/\theta 2$ is 1 (indicated by solid line A) and also in a comparable case that no vacant holes are provided (indicated by solid line B). As understood from FIG. 7, in the case that the vacant holes 104 are provided, the change of magnetic field in the boundary zone 107 is steep. In other words, leakage of magnetic flux of the permanent magnet 102 is small. Accordingly, the magnetic flux density in the second magnetic pole portion 106 becomes higher compared with the case that no vacant holes are provided.

Furthermore, as understood from FIG. 7, in the case the vacant holes 104 are provided, there is no substantial difference in the absolute value of magnetic flux density between the first magnetic pole portions 105 and the second magnetic pole portions 106. The symmetry in the distribution of magnetic flux along the circumferential direction can be improved and, accordingly, the toque ripple becomes small.

It is needless to say that the total number of magnet accommodation holes 103 and the permanent magnets 102 is not limited to 3 and, therefore, can be reduced or increased to 1, 2, 4, or others.

In this respect, the fourth embodiment of the present invention provides the magnet-saving type rotor for a synchronous motor including the rotor core 101 and a total of k permanent magnets 102 installed in the rotor core 101 closely to the outer cylindrical surface of the rotor core 101. The rotor core 101 includes a total of k magnet accommodation holes 103 formed in the rotor core 101 for separately accommodating the permanent magnets 102, so as to extend in the axial direction of the rotor core 101 and disposed at equal angular pitches of $\theta n$ (=360/k degrees). A total of 2 k magnet-less holes 104 are formed in the rotor core 101 for accommodating no permanent magnets, so as to extend in the axial direction of the rotor core 101 and positioned continuously at both circumferential ends of k magnet accommodation holes 103.

The first magnetic pole portions 105, having the first polarity, are positioned at the radial outer side of the magnet accommodation holes 103 in the outer peripheral region of the rotor core 101. The second magnetic pole portions 106, having the second polarity different from the first polarity, are positioned with no permanent magnets between any two of magnet-less holes 104 arrayed next to each other along the circumferential direction in the outer peripheral region of the rotor core 101. The sector angle occupied by each of magnet-less holes 104 positioned at both circumferential ends of respective magnet accommodation holes 103 is equal to $\theta 0$ (=$0.5(\theta n-\theta 1-\theta 2)$), where $\theta 1$ represents the sector angle occupied by each of the first magnetic pole portions 105, $\theta 2$ represents the sector angle occupied by each of the second magnetic pole portions 106, and $\theta 0$ represents the sector angle occupied by the boundary zone 107 intervening between the first magnetic pole portions 105 and the second magnetic pole portions 106.

Fifth Embodiment

A magnet-saving type rotor for a synchronous motor in accordance with the fifth embodiment will be explained with reference to FIG. 8.

Figure 8:
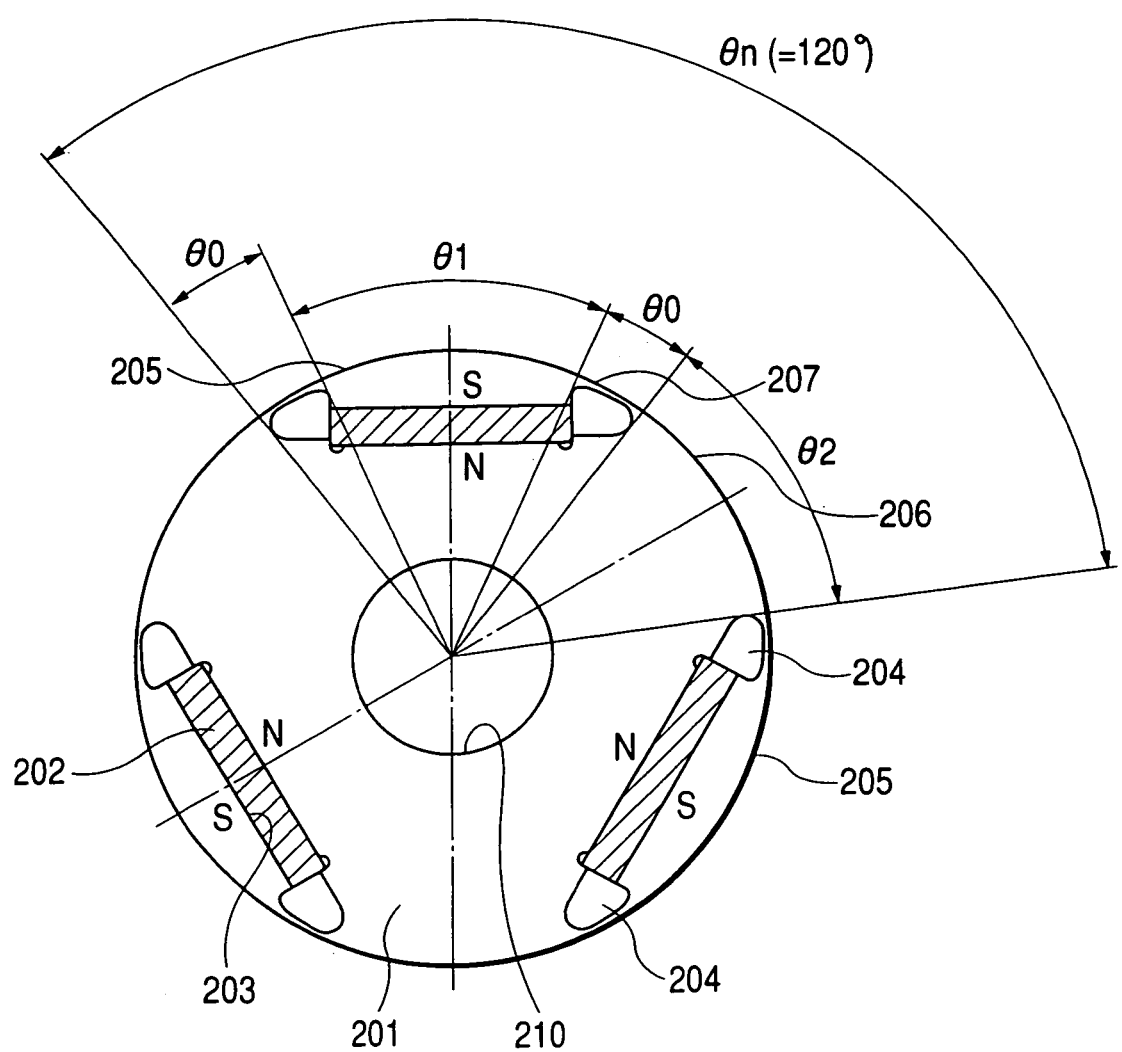
FIG. 8 is a cross-sectional view showing a magnet-saving type rotor in accordance with a fifth embodiment of the present invention.

The magnet-saving type rotor shown in FIG. 8 includes a rotor core 201 made of soft iron and a total of three permanent magnets 202 made of rare-earth magnet. The rotor core 201 includes the same number of (i.e., three) permanent magnet accommodation holes 203 for separately accommodating the permanent magnets 202. Respective permanent magnet accommodation holes 203 extend in an axial direction of the rotor core 201 and are disposed at equal angular pitches of 120°. Furthermore, the rotor core 201 includes a total of six vacant holes (i.e., magnet-less holes) 204 for accommodating no permanent magnets. Respective vacant holes 204 extend in the axial direction of the rotor core 201 and are positioned continuously at both circumferential ends of respective magnet accommodation holes 203. The vacant holes 204 are continuously or integrally formed with the associated magnet accommodation holes 203 so that no core portion is provided between the vacant holes 204 and the magnet accommodation holes 203.

A first magnetic pole portion 205, having a first polarity, is positioned at the radial outer side of each magnet accommodation hole 203 in an outer peripheral region of the rotor core 201. The first polarity (e.g., S-pole) is given or formed by the permanent magnet 202 installed in the magnet accommodation hole 203. A second magnetic pole portion 206, having a second polarity (e.g., N-pole), is positioned with no permanent magnets between any two vacant holes 204 arrayed next to each other along the circumferential direction in the outer peripheral region of the rotor core 201. A plurality of boundary zones 207 are provided between the first magnetic pole portions 205 and the second magnetic pole portions 206.

According to the arrangement shown in FIG. 8, a two-pole pitch angle $\theta n$ is equal to a sum of a sector angle $\theta 1$ occupied by the first magnetic pole portion 205, a sector angle $\theta 2$ occupied by the second magnetic pole portion 206, and two times a sector angle $\theta 0$ occupied by the boundary zone 207. All of the sector angle $\theta 0$ is substantially occupied by the vacant hole 204 located in the boundary zone 207. In this embodiment, each sector angle is defined as a central angle of any sector formed about the axial center of rotor core 201 (i.e., the axial center of a rotary shaft hole 210 into which a rotor shaft is inserted by press-fitting).

The permanent magnets 202 of this embodiment are made of rare-earth magnet. The sector angle $\theta 1$ occupied by the first magnetic pole portion 205 is equal to the sector angle $\theta 2$ occupied by the second magnetic pole portion 206. Furthermore, a ratio ($\theta 0/\theta n$) of the sector angle $\theta 0$ occupied by each vacant hole 204 to the two-pole pitch angle $\theta n$ is 0.065.

As shown in FIG. 8, each permanent magnet 202 has a flat rectangular shape with four corners. The sector angle θ1 is an angle formed between two lines originating from the axial center of rotor core 201 and passing two radial outer corners of the rectangular permanent magnet 202. The clearance, provided between the vacant hole 204 and the outer cylindrical surface of the rotor core 201, is formed as thin as possible within the restrictions for assuring sufficient mechanical strength for the rotor core 201.

The sector angle θ2 is an angle formed between two lines originating from the axial center of rotor core 201 and passing the edges of vacant holes 204 positioned in the boundary zones 207.

According to the above-described permanent-magnet rotor for an inner rotor type electric rotary machine, the magnetic flux density in the stator/rotor gap can be improved. The motor output is increased.

Figure 9:
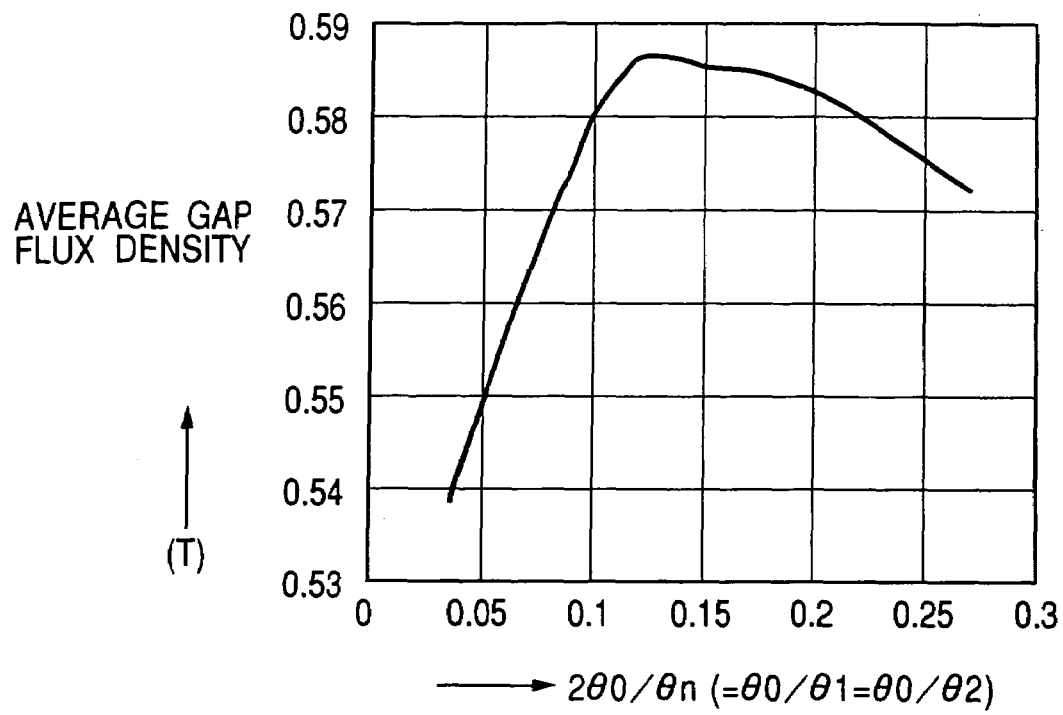
FIG. 9 is a graph showing test data with respect to the average magnetic flux density in the stator/rotor gap obtained when the sector angle of vacant holes is variously changed, in accordance with the fifth embodiment of the present invention.
Figure 10:
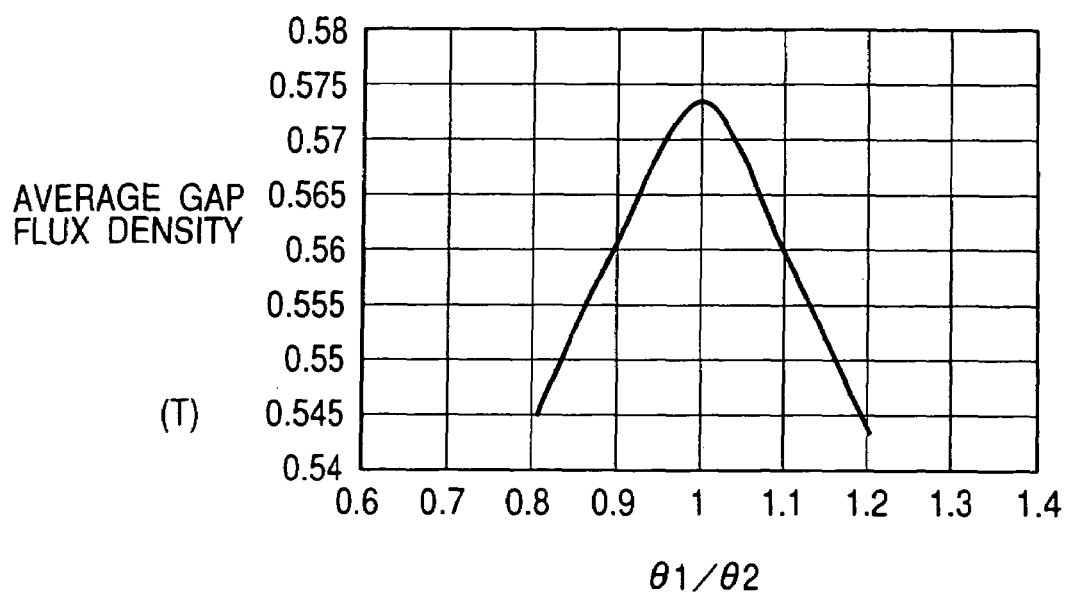
FIG. 10 is a graph showing test data with respect to the average magnetic flux density in the stator/rotor gap obtained when the ratio of first magnetic pole portions to second magnetic pole portions is variously changed, in accordance with the fourth embodiment of the present invention.

FIGS. 9 and 10 show test data. The tested rotor has the shape shown in FIG. 8. The outer diameter of rotor core 201 is 50 mm, and the inner diameter of rotor core 201 is 16 mm.

FIG. 9 shows the average magnetic flux density in the stator/rotor gap obtained when the sector angle θ0 of the vacant hole 204 is variously changed under the condition that the sector angle θ1 of the first magnetic pole portion 205 is equal to the sector angle θ2 of the second magnetic pole portion 206. As apparent from FIG. 9, to obtain excellent magnetic flux density, it is desirable that the ratio 2θ0/θn is in the range from 0.1 to 0.25.

FIG. 10 shows the average magnetic flux density in the stator/rotor gap obtained when the ratio θ1/θ2 is variously changed under the condition that the ratio 2θ0/θn is fixed to 0.125. As apparent from FIG. 10, to obtain excellent magnetic flux density, it is desirable that the ratio θ1/θ2 is in the range from 0.9 to 1.1.

Figure 11:
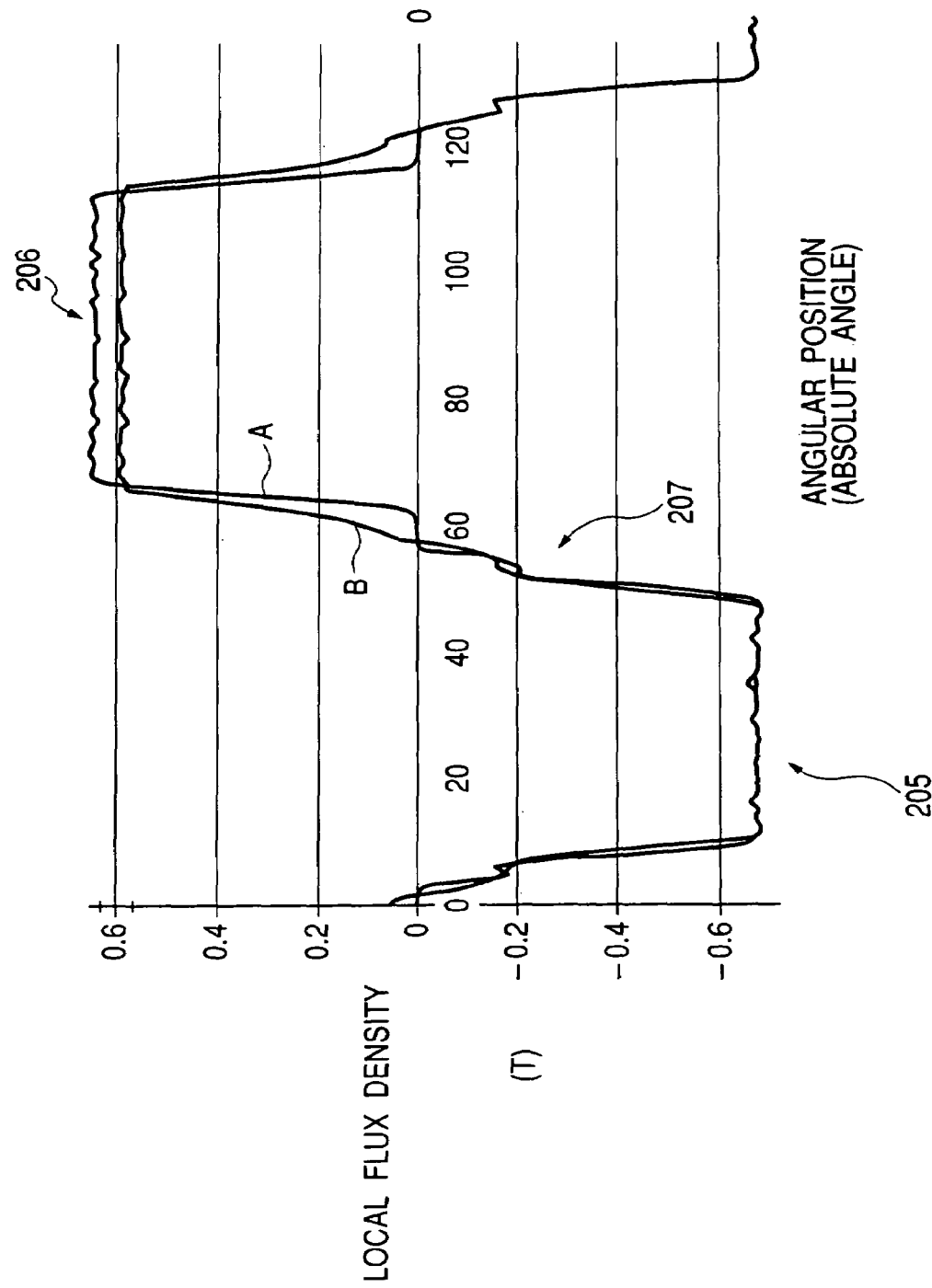
FIG. 11 is a view showing the circumferential distribution of the magnetic flux density in the stator/rotor gap in the case of providing vacant holes and also in the case of providing no vacant holes, in accordance with the fifth embodiment of the present invention.

FIG. 11 shows the circumferential distribution of the magnetic flux density in the stator/rotor gap in the case that the vacant holes 204 are provided under the condition that the ratio 2θ0/θn is 0.125 and the ratio θ1/θ2 is 1 (indicated by solid line A) and also in a comparable case that no vacant holes are provided (indicated by solid line B). As understood from FIG. 11, in the case that the vacant holes 204 are provided, the change of magnetic field in the boundary zone 207 is steep. In other words, leakage of magnetic flux of the permanent magnet 202 is small. Accordingly, the magnetic flux density in the second magnetic pole portion 206 becomes higher compared with the case that no vacant holes are provided.

Furthermore, as understood from FIG. 11, in the case the vacant holes 204 are provided, there is no substantial difference in the absolute value of magnetic flux density between the first magnetic pole portions 205 and the second magnetic pole portions 206. The symmetry in the distribution of magnetic flux along the circumferential direction can be improved and, accordingly, the toque ripple becomes small.

It is needless to say that the total number of magnet accommodation holes 203 and the permanent magnets 202 is not limited to 3 and, therefore, can be reduced or increased to 1, 2, 4, or others.

In this respect, the fifth embodiment of the present invention provides the magnet-saving type rotor for a synchronous motor including the rotor core 201 and a total of k permanent magnets 202 installed in the rotor core 201 closely to the outer cylindrical surface of the rotor core 201. The rotor core 201 includes a total of k magnet accommodation holes 203 formed in the rotor core 201 for separately accommodating the permanent magnets 202, so as to extend in the axial direction of the rotor core 201 and disposed at equal angular pitches of θn (=360/k degrees). A total of 2 k magnet-less holes 204 are formed in the rotor core 201 for accommodating no permanent magnets, so as to extend in the axial direction of the rotor core 201 and positioned continuously at both circumferential ends of k magnet accommodation holes 203.

The first magnetic pole portions 205, having the first polarity, are positioned at the radial outer side of the magnet accommodation holes 203 in the outer peripheral region of the rotor core 201. The second magnetic pole portions 206, having the second polarity different from the first polarity, are positioned between any two of magnet-less holes 204 arrayed next to each other along the circumferential direction in the outer peripheral region of the rotor core 201.

The ratio (θ2/θ1) of the sector angle θ2 occupied by each of the second magnetic pole portions 206 to the sector angle θ1 occupied by each of the first magnetic pole portions 205 is in the range from 0.9 to 1.1, and the sector angle θ0 occupied by each of boundary zones 207 intervening between the first magnetic pole portions 205 and the second magnetic pole portions 206 is expressed by 0.5(θn−θ1−θ2).

Sixth Embodiment

A permanent-magnet type synchronous motor with a stator and a rotor is a representative synchronous motor. The stator of the permanent-magnet type synchronous motor, configured into a cylindrical sleevelike shape, has a stator core and coils. The rotor, configured into a cylindrical columnar shape, has a rotor core and permanent magnets. A gap between the inner cylindrical surface of the stator core and the outer cylindrical surface of the rotor core is generally set in the range of 0.5 mm to 0.8 mm considering the flow of magnetic flux between the rotor and the stator.

The rotor includes a total of k (e.g., two to four) permanent magnets installed in the rotor core closely to an outer cylindrical surface of the rotor core and disposed at predetermined angular pitches in the circumferential direction. A total of k magnet accommodation holes are formed in the rotor core for separately accommodating the permanent magnets. The magnet accommodation holes, extending in the axial direction of the rotor core, are disposed at equal angular pitches of θn (=360/k degrees). A total of 2 k magnet-less holes are formed in the rotor core for accommodating no permanent magnets. The magnet-less holes, extending in the axial direction of the rotor core, are formed continuously at both circumferential ends of each of k magnet accommodation holes. A pair of bridges is provided between an outer cylindrical surface of the rotor core and the magnet-less holes positioned at both circumferential ends of each magnet accommodation hole. When seen in a transverse cross-sectional view or in an end view, each of the magnet accommodation hole is elongated in a direction perpendicular to the radial direction of the rotor core. A pair of magnet-less holes is formed continuously at both circumferential ends of an associated magnet accommodation hole.

The cross-sectional shape of each magnet-less hole is a right triangular shape with a hypotenuse extending along the outer cylindrical surface of the rotor core. A bottom edge of the magnet-less hole, one of the remaining edges, is continuous with the bottom wall of the associated magnet accommodation hole. A side edge of the magnet-less hole, the other of the remaining edges, is common with the side wall of the associated magnet accommodation hole. Preferably, the permanent magnets are made of rare-earth permanent magnet.

A total of k first magnetic pole portions, having a first polarity, are positioned at the radial outer side of the magnet accommodation holes in the outer peripheral region of the rotor core. A total of k second magnetic pole portions, having a second polarity, are positioned between any two of the magnet-less holes arrayed next to each other along the circumferential direction in the outer peripheral region of the rotor core. Thus, a total of 2 k magnetic pole portions are alternately provided along the circumferential direction of the rotor core.

In general, the thinner the thickness of each bridge is, the less the leakage of magnetic flux is. However, from the manufacturing and strength restrictions, there is a limit in reducing the thickness of respective bridges. Accordingly, from the view point of obtaining a sufficient gap magnetic flux density for securing a required torque, the sixth embodiment of the present invention optimizes the thickness of respective bridges in the relationship with the gap between the stator and the rotor.

Figure 14:
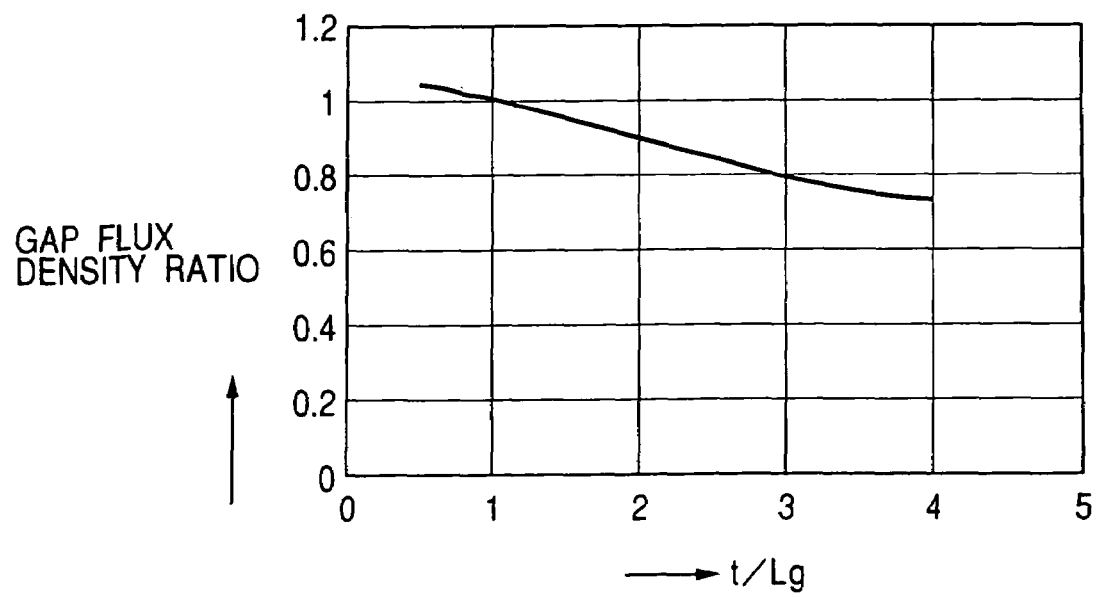
FIG. 14 is a graph explaining the performance of the magnet-saving type rotor of the synchronous motor shown in FIG. 12.

FIG. 14 is a graph showing the gap magnetic flux density ratio in relation to the ratio t/Lg, where t represents the thickness of the bridge and Lg represents the gap between the stator and the rotor. The thickness t of the bridge is a radial clearance between the magnet-less holes and the outer cylindrical surface of the rotor core. The ratio t/Lg becomes large with increasing thickness of respective bridges and becomes small with decreasing thickness of the bridges. The gap magnetic flux density ratio is the normalized density of magnetic flux passing the gap between the stator and the rotor.

When the thickness t of the bridges is equal to the gap Lg between the magnet-less holes and the outer cylindrical surface of the rotor core (i.e., t/Lg=1), the gap magnetic flux density ratio takes the value 1. FIG. 14 shows the gap magnetic flux density ratio in relation to the change of t/Lg. When the ratio t/Lg is 3, the gap magnetic flux density ratio is approximately 0.79. Due to manufacturing and strength restrictions, the ratio t/Lg cannot be reduced to a small value less than 0.5. In the case that the ratio t/Lg is small (e.g., 0.5 or less), the gap Lg increases relatively. Hence, the gap magnetic flux density decreases. On the contrary, in the case that the ratio t/Lg is large (e.g., 3 or more), the leakage of magnetic flux in the bridges increases relatively.

From the foregoing, to assure satisfactory gap magnetic flux density ratio, it is preferable that the ratio t/Lg (i.e., the ratio of the thickness of each bridge to the gap between the rotor core and the stator) is in the range from 0.5 to 3.

The sixth embodiment of the present invention is explained in more detail with reference to FIGS. 12 and 13.

Figure 12:
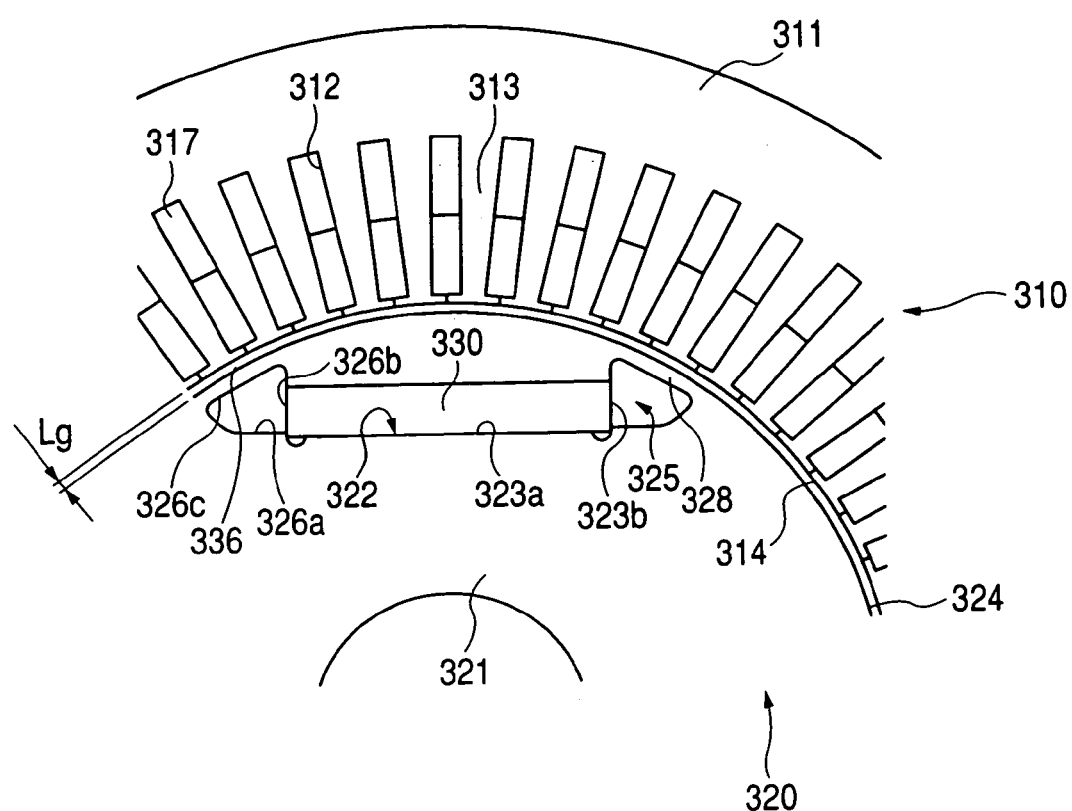
FIG. 12 is an enlarged view showing an end surface of a synchronous motor in accordance with a sixth embodiment of the present invention.
Figure 13:
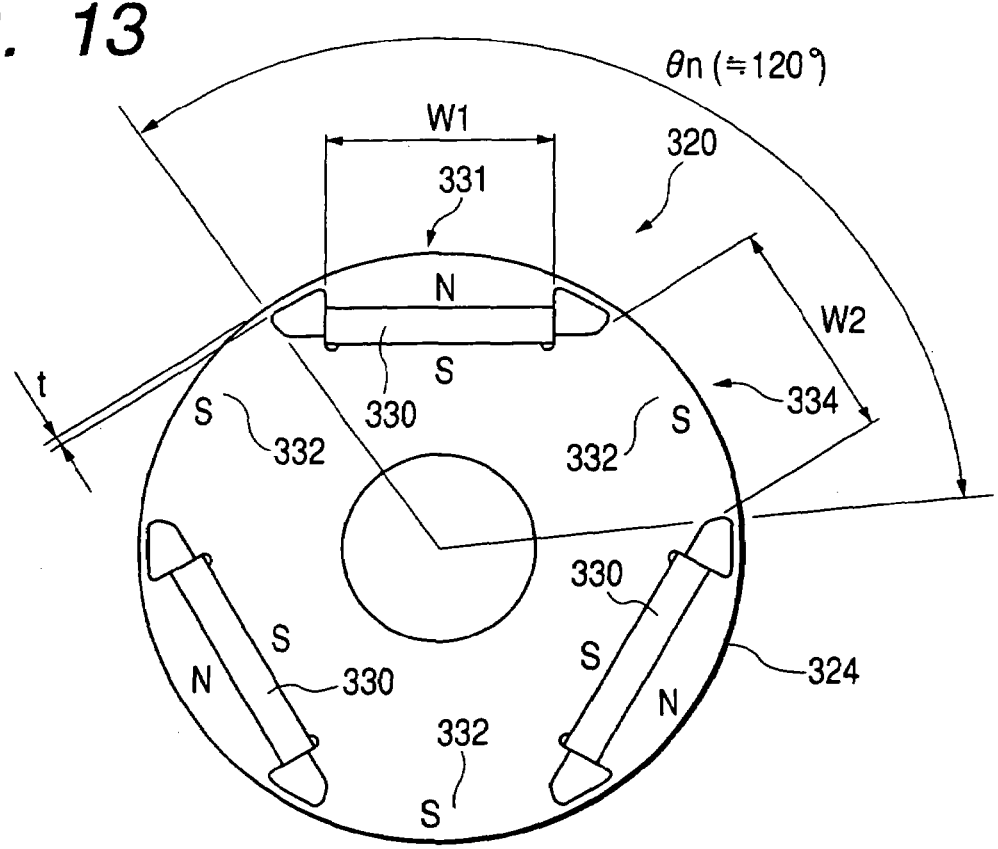
FIG. 13 is a transverse cross-sectional view showing a magnet-saving type rotor of the synchronous motor shown in FIG. 12.

The permanent-magnet type synchronous motor (brushless motor) shown in FIGS. 12 and 13 includes a stator 310 and a rotor 320. The stator 310 includes a stator core 311 and stator coils 317. The stator core 311 has a sleevelike shape with an outer diameter of approximately 85 mm and an inner diameter of approximately 51 mm. A plurality of coil insertion holes 312, each extending in the axial direction from one end surface to the other end surface of the stator 310, are provided in the stator 310 so as to be disposed at predetermined angular pitches in the circumferential direction. Numerous teeth 313 are provided between adjacent coil insertion holes 312. Respective coil insertion holes 312, having the same width in the circumferential direction, accommodate the stator coils 317.

The rotor 320 includes a rotor core 321 and permanent magnets 330. The rotor core 321 has a columnar shape with an outer diameter of approximately 50 mm. A total of three permanent magnet accommodation holes 322, each extending in the axial direction from one end surface to the other end surface of the rotor core 321, are formed in the rotor core 321 so as to be disposed at predetermined angular pitches in the circumferential direction. When seen in a transverse cross-sectional view, each of the magnet accommodation holes 322 is configured into a flat rectangular shape elongated in a direction perpendicular to the radial direction of the rotor core 321. In other words, each magnet accommodation hole 322 is disposed on a chord of a circle corresponding to the outer cylindrical surface of the rotor core 321.

A pair of magnet-less holes 325 (hereinafter, referred to as vacant holes) is formed continuously at both circumferential ends of an associated magnet accommodation hole 322. A slight stepped portion is provided between the bottom edge of the vacant hole 325 and the radial inner principal plane of the associated magnet accommodation hole 322. According to this embodiment, a total of three magnet accommodation holes 322 are formed at equal angular pitches 120 (=360/3) degrees.

The cross-sectional shape of each vacant hole 325, taken along a plane normal to the axis of the rotor core 321, is a right angle isosceles triangle. A bottom wall 326a of vacant hole 325 is continuously with the bottom wall 323a of magnet accommodation hole 322 and extends closely to the outer cylindrical surface 324 of the rotor core 321. A side wall 326b of vacant hole 325 agrees with a side wall 323b of magnet accommodation hole 322. A hypotenuse 326c of vacant hole 325 extends along the outer cylindrical surface 324 of the rotor core 321. As a result, a thin bridge 328 having a uniform thickness is formed between each vacant hole 325 and the outer cylindrical surface 324 of the rotor core 321.

A total of three permanent magnets 330, each being configured into a thin rectangular plate shape having an S-pole at a radial inner surface and an N-pole at a radial outer surface, are accommodated in respective magnet accommodation holes 322. A total of three first magnetic pole portions 331, having a first polarity, are formed. In each of the first magnetic pole portions 331, the radial outer region of the rotor core 321 outside the magnet accommodation hole 322 serves as N-pole while the radial inner region of the rotor core 321 inside the magnet accommodation hole 322 serves as S-pole. A total of three second magnetic pole portions 334, having a second polarity, are formed between two adjacent first magnetic pole portions 331. Each of the second magnetic pole portions 334, serving as S-pole, is positioned between any two of the vacant holes 325 arrayed next to each other along the circumferential direction in the outer peripheral region (i.e., a protruding portion 332) of the rotor core 321.

Furthermore, a circumferential size W1 of the first magnetic pole portion 331 is 1.1 times a circumferential size W2 of the second magnetic pole portion 334. The circumferential size W2 of the second magnetic pole portion 334 is equal to the width of protruding portion 332, more specifically equal to a distance between two vacant holes 325 disposed next to each other at both circumferential ends of the second magnetic pole portion 334.

A gap 336 is provided between an inner cylindrical surface 314 of the stator core 311 and the outer cylindrical surface 324 of the rotor core 321. The thickness of the gap 336, i.e., the radial size of the gap 336, is constant in the circumferential direction and also in the axial direction and is substantially equal to the thickness of the bridge 328.

The magnetic flux of the rotor 320 goes out of the N-pole of respective first magnetic pole portions 331 and enters into the S-poles of respective second magnetic pole portions 334. A magnetic pole sensor (not shown) detects the magnetic pole of rotor 320. When current is supplied to the coil 317 of stator 310 corresponding to the detected magnetic pole, the rotor 320 rotates due to electromagnetic interaction between the current flowing in the coil 317 and the magnetic flux of the permanent magnet 330.

As described above, according to this embodiment, the thickness of each bridge 328 is substantially equal to the radial size of gap 336. The circumferential length of the first magnetic pole portion 331 is longer than the circumferential length of the second magnetic pole portion 334. The sixth embodiment brings the following effects.

First of all, in the rotor core 321, it becomes possible to suppress the leakage of magnetic flux via the bridges 328 at both circumferential ends of each magnet accommodation hole 322, because the thickness of bridge 328 is reduced to the level approximately identical with the size of gap 336 so that the magnetic flux flowing across the bridge 328 can be saturated.

Second, it is easy to form the bridges 328 having a desired thickness because a pair of vacant holes 325, each having a cross-sectional shape of a right angle isosceles triangle, is formed continuously with the magnet accommodation hole 322 at both circumferential ends thereof and because the hypotenuse of each vacant hole 325 extends along the outer cylindrical surface 324 of the rotor core 321. The height of side wall 326b of each vacant hole 325, i.e., the radial size of the vacant hole 325, is fairly larger than the height of side wall 323b of the magnet accommodation hole 322. This arrangement brings the effect of suppressing the magnetic flux from leaking into the vacant cavity 325 at both ends of the permanent magnets 330.

Third, the characteristics of the rotor 320 can be improved especially in the balance of magnetic flux amount in the first and second magnetic pole portions 331 and 334 because the circumferential length W1 of the first magnetic pole portion 331 is slightly longer than the circumferential length W2 of the second magnetic pole portion 334.

Finally, even though only three permanent magnets are accommodated in the rotor 320 of this embodiment, it is possible to obtain the magnetic flux density obtainable by a conventional rotor accommodating six permanent magnets. As a result, it becomes possible to reduce the number of required permanent magnets to a half level. The manufacturing cost can be reduced greatly. If the circumferential length W1 of the first magnetic pole portion 331 is shorter than the circumferential length W2 of the second magnetic pole portion 334, the magnetic flux amount of the first magnetic pole portion 331 will decrease and accordingly the motor characteristics will deteriorate.

As described above, according to the magnet-saving type rotor for a synchronous motor in accordance with the sixth embodiment of the present invention, thin bridges are formed between the outer cylindrical surface of the rotor and the magnet-less holes provided continuously at both circumferential ends of each magnet accommodation hole of the rotor. This arrangement is effective to suppress the magnetic flux from leaking via the bridges in the circumferential direction. Accordingly, almost all of the magnetic flux effectively flows from the rotor to the stator or vise versa. The rotor characteristics can be improved.

According to the above-described preferred embodiment of the present invention, each of the bridges has a uniform thickness in the circumferential direction and the magnetic flux in each bridge is saturated. This is advantageous in preventing the magnetic flux from flowing via the bridges.

Furthermore, according to the above-described preferred embodiment of the present invention, the cross-sectional shape of respective magnet-less holes is a right triangular shape with the hypotenuse extending along the outer cylindrical surface of the rotor core. This is advantageous in easily manufacturing the bridges having a predetermined thickness. Furthermore, according to the above-described preferred embodiment of the present invention, the circumferential size of the first magnetic pole portion is larger than the circumferential size of the second magnetic pole portion. This is advantageous in balancing the magnetic flux amount of the first magnetic pole portions having the first polarity with the magnetic flux amount of the second magnetic pole portions having the second polarity. The rotor characteristics can be improved.

Seventh Embodiment

Figure 15:
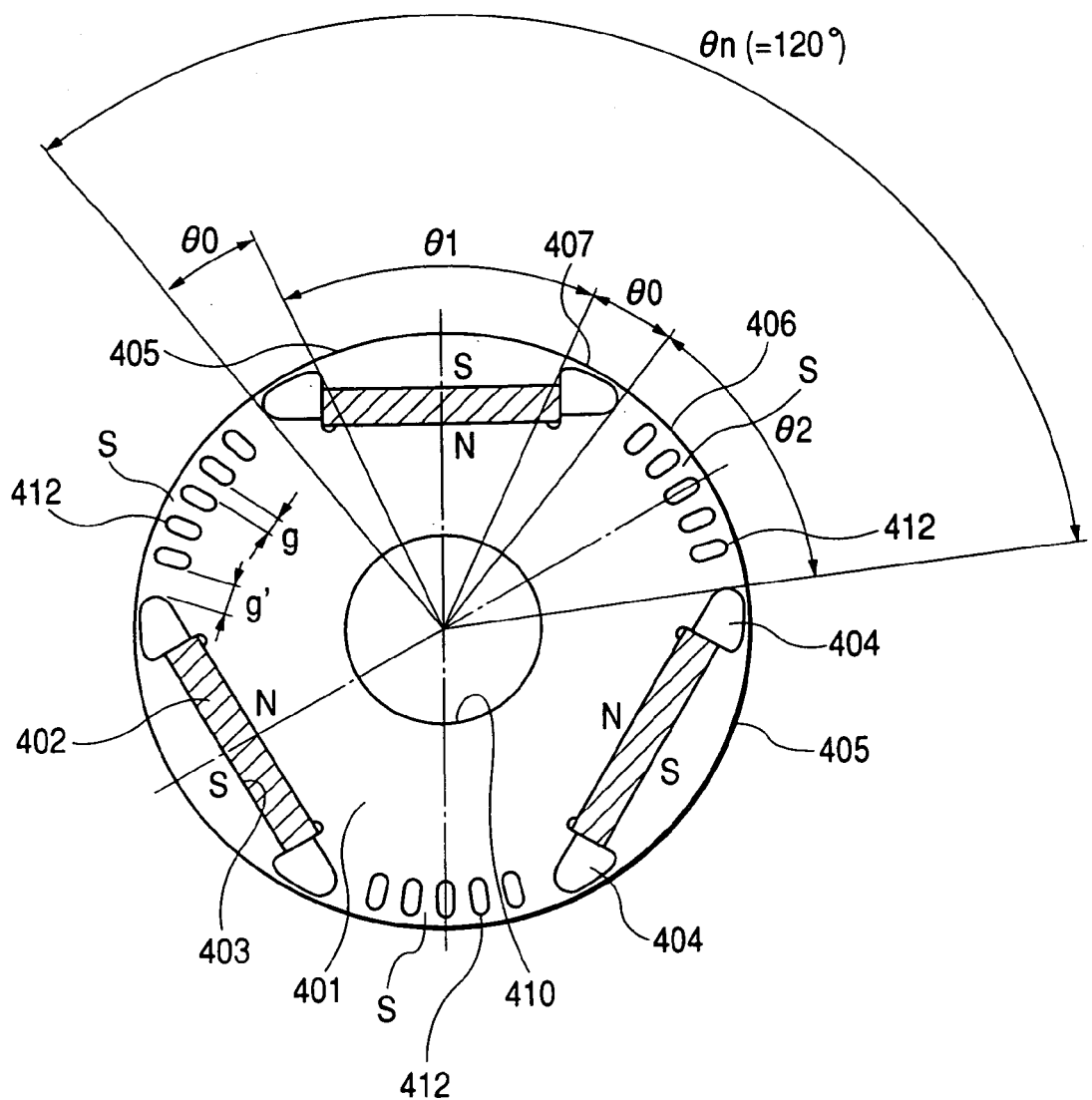
FIG. 15 is a cross-sectional view showing a magnet-saving type rotor in accordance with a seventh embodiment of the present invention.

FIG. 15 shows a seventh embodiment of the present invention which is substantially equivalent to the combination of the above-described first embodiment and the above-described fourth or fifth embodiment.

More specifically, the magnet-saving type rotor shown in FIG. 15 includes a rotor core 401 made of soft iron and a total of three permanent magnets 402. The rotor core 401 includes the same number of (i.e., three) permanent magnet accommodation holes 403 for separately accommodating the permanent magnets 402. Respective permanent magnet accommodation holes 403 extend in an axial direction of the rotor core 401 and are disposed at equal angular pitches of 120°. Furthermore, the rotor core 401 includes a total of six vacant holes (i.e., magnet-less holes) 404 for accommodating no permanent magnets. Respective vacant holes 404 extend in the axial direction of the rotor core 401 and are positioned at both circumferential ends of respective magnet accommodation holes 403. The vacant holes 404 are continuously formed with the associated magnet accommodation holes 403 so that no core portion is provided between the vacant holes 404 and the magnet accommodation holes 403.

A first magnetic pole portion 405, having a first polarity, is positioned at the radial outer side of each magnet accommodation hole 403 in an outer peripheral region of the rotor core 401. The first polarity (e.g., S-pole) is given by the permanent magnet 402 installed in the magnet accommodation hole 403. A second magnetic pole portion 406, having a second polarity (e.g., N-pole), is positioned with no permanent magnets between any two vacant holes 404 arrayed next to each other along the circumferential direction in the outer peripheral region of the rotor core 401. A plurality of boundary zones 407 are provided between the first magnetic pole portions 405 and the second magnetic pole portions 406.

According to the arrangement shown in FIG. 15, a two-pole pitch angle $\theta n$ is equal to a sum of a sector angle $\theta 1$ occupied by the first magnetic pole portion 405, a sector angle $\theta 2$ occupied by the second magnetic pole portion 406, and two times a sector angle $\theta 0$ occupied by the boundary zone 407. All of the sector angle $\theta 0$ is substantially occupied by the vacant hole 404 located in the boundary zone 407. In this embodiment, each sector angle is defined as a central angle of any sector formed about the axial center of rotor core 401 (i.e., the axial center of a rotary shaft hole 410 into which a rotor shaft is inserted by press-fitting).

The permanent magnets 402 of this embodiment are made of rare-earth magnet. The sector angle $\theta 1$ occupied by the first magnetic pole portion 405 is equal to the sector angle θ2 occupied by the second magnetic pole portion 406. Furthermore, a ratio (θ0/θn) of the sector angle θ0 occupied by each vacant hole 404 to the two-pole pitch angle θn is 0.065.

As shown in FIG. 15, each permanent magnet 402 has a flat rectangular shape with four corners. The sector angle θ1 is an angle formed between two lines originating from the axial center of rotor core 401 and passing two radial outer corners of the rectangular permanent magnet 402. The clearance, provided between the vacant hole 404 and the outer cylindrical surface of the rotor core 401, is formed as thin as possible within the restrictions for assuring sufficient mechanical strength for the rotor core 401.

The sector angle θ2 is an angle formed between two lines originating from the axial center of rotor core 401 and passing the edges of vacant holes 404 positioned in the boundary zones 407.

According to the above-described permanent-magnet rotor for an inner rotor type electric rotary machine, the magnetic flux density in the stator/rotor gap can be improved. The motor output is increased.

Furthermore, according to this embodiment, a total of five vacant holes (i.e., magnet-less holes) 412 are formed closely to the outer cylindrical surface of the rotor core 401 so as to be arrayed in the circumferential direction in each second magnetic pole portion 406. A predetermined gap g is provided between two adjacent vacant holes 412. The cross section of respective vacant holes 412 is an elongated shape extending in the radial direction.

Respective vacant holes 412 extend in the axial direction of the rotor core 401. A gap g' is provided between the outermost vacant hole 412 in the second magnetic pole portion 406 and the vacant hole 404 positioned in the boundary zone 407. The gap g' is larger than the above-described gap g. The vacant holes 412 are provided closely to the outer cylindrical surface of the rotor core 401.

As described in the first embodiment, this arrangement effectively suppresses the reduction of q-axis current flux which is necessary to produce the reluctance torque. The vacant holes 412 have the function of reducing an invalid or reactive flux and also reducing leakage inductance, iron or core loss, and armature reaction. It is needless to say that the number of vacant holes 412 and the cross-sectional configuration of respective holes 412 can be modified in various ways.

As described above, the seventh embodiment of the present invention provides the magnet-saving type rotor for a synchronous motor including the rotor core 401 and a total of k permanent magnets 402 installed in the rotor core 401 closely to the outer cylindrical surface of the rotor core 401. The rotor core 401 includes a total of k magnet accommodation holes 403 formed in the rotor core 401 for separately accommodating the permanent magnets 402, so as to extend in the axial direction of the rotor core 401 and disposed at equal angular pitches of θn (=360/k degrees). A total of 2 k magnet-less holes 404 are formed in the rotor core 401 for accommodating no permanent magnets, so as to extend in the axial direction of the rotor core 401 and positioned continuously at both circumferential ends of k magnet accommodation holes 403.

The first magnetic pole portions 405, having the first polarity, are positioned at the radial outer side of the magnet accommodation holes 403 in the outer peripheral region of the rotor core 401. The second magnetic pole portions 406, having the second polarity different from the first polarity, are positioned with no permanent magnets between any two of magnet-less holes 404 arrayed next to each other along the circumferential direction in the outer peripheral region of the rotor core 401.

Additional magnet-less holes, extending in the axial direction in the vicinity of the outer cylindrical surface of the rotor core 401, are provided in the second magnetic pole portions 406.

The sector angle occupied by each of magnet-less holes 404 positioned continuously at both circumferential ends of respective magnet accommodation holes 403 is equal to θ (=0.5(θn−θ1−θ2)), where θ1 represents the sector angle occupied by each of the first magnetic pole portions 405, θ2 represents the sector angle occupied by each of the second magnetic pole portions 406, and θ0 represents the sector angle occupied by the boundary zone 407 intervening between the first magnetic pole portions 405 and the second magnetic pole portions 406.

The ratio (θ2/θ1) of the sector angle θ2 occupied by each of the second magnetic pole portions 406 to the sector angle θ1 occupied by each of the first magnetic pole portions 405 is in the range from 0.9 to 1.1.

The permanent magnets 402 of this embodiment are made of rare-earth magnet.

Furthermore, a ratio (θ0/θn) of the sector angle θ0 occupied by each vacant hole 404 to the two-pole pitch angle θn is in the range from 0.05 to 0.125.

Eighth Embodiment

An eighth embodiment of the present invention is substantially equivalent to the combination of the above-described second embodiment and the above-described fourth or fifth embodiment.

In other words, the eighth embodiment of the present invention is different from the above-described seventh embodiment only in that the vacant holes 412 are provided with a basket type wiring formed by aluminum die-cast. This makes it possible to suppress the generation of induction torque and prevent the motor from going into a disordered or non-synchronous condition.

Ninth Embodiment

Figure 16:
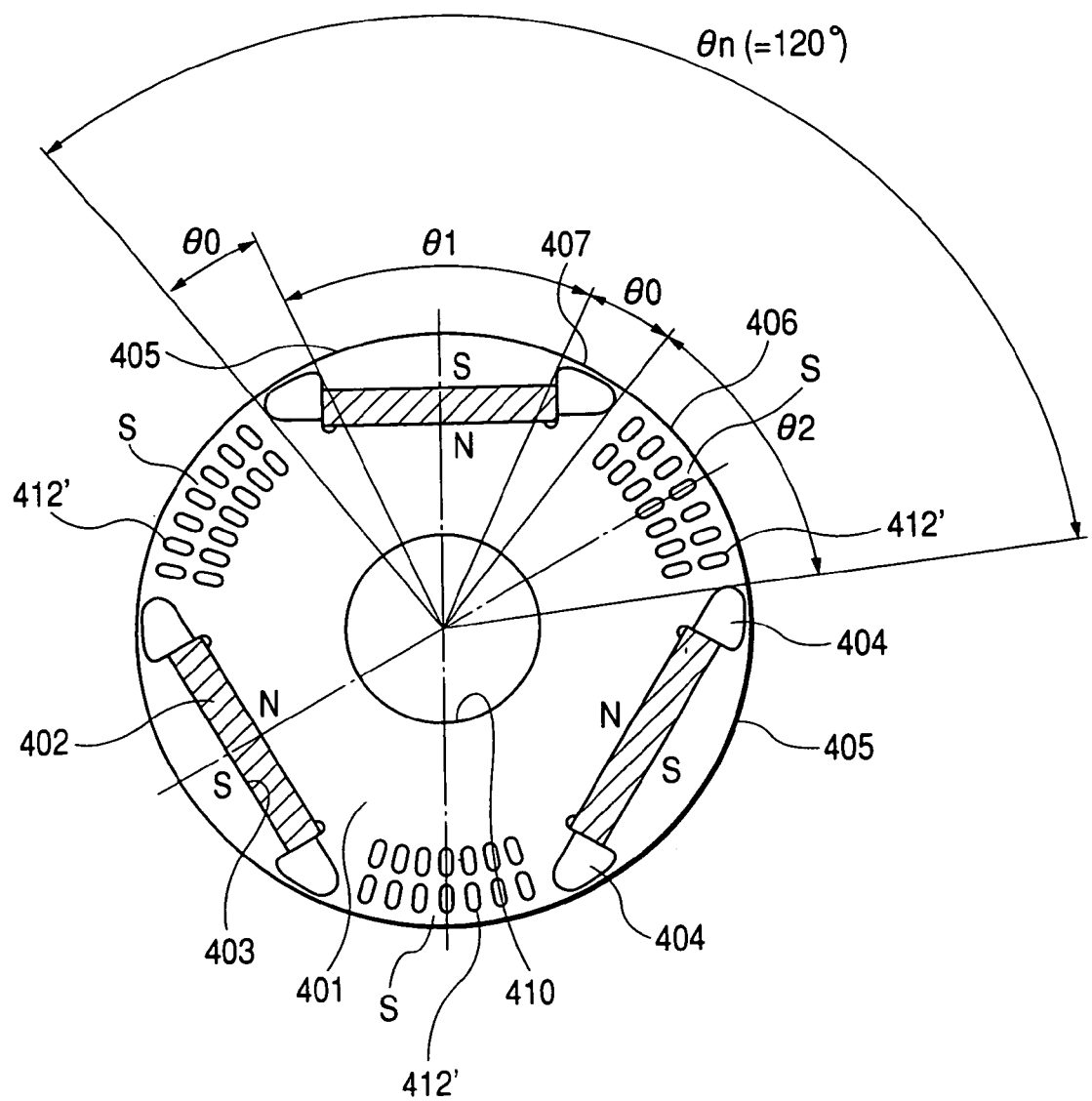
FIG. 16 is a cross-sectional view showing a magnet-saving type rotor in accordance with a ninth embodiment of the present invention.

FIG. 16 shows a ninth embodiment of the present invention which is substantially equivalent to the combination of the above-described third embodiment and the above-described fourth or fifth embodiment.

In other words, the ninth embodiment of the present invention is different from the above-described seventh embodiment in that vacant holes 412' are arrayed in a predetermined matrix pattern with two lines extending in the radial direction and seven rows extending in the circumferential direction of the rotor core 401. Respective vacant holes 412' extend in the axial direction of the rotor core 401. With this arrangement, both the magnetic path for passing the magnet fluxes and the magnetic path for passing the q-axis current fluxes can be adequately formed.

Tenth Embodiment

Figure 17:
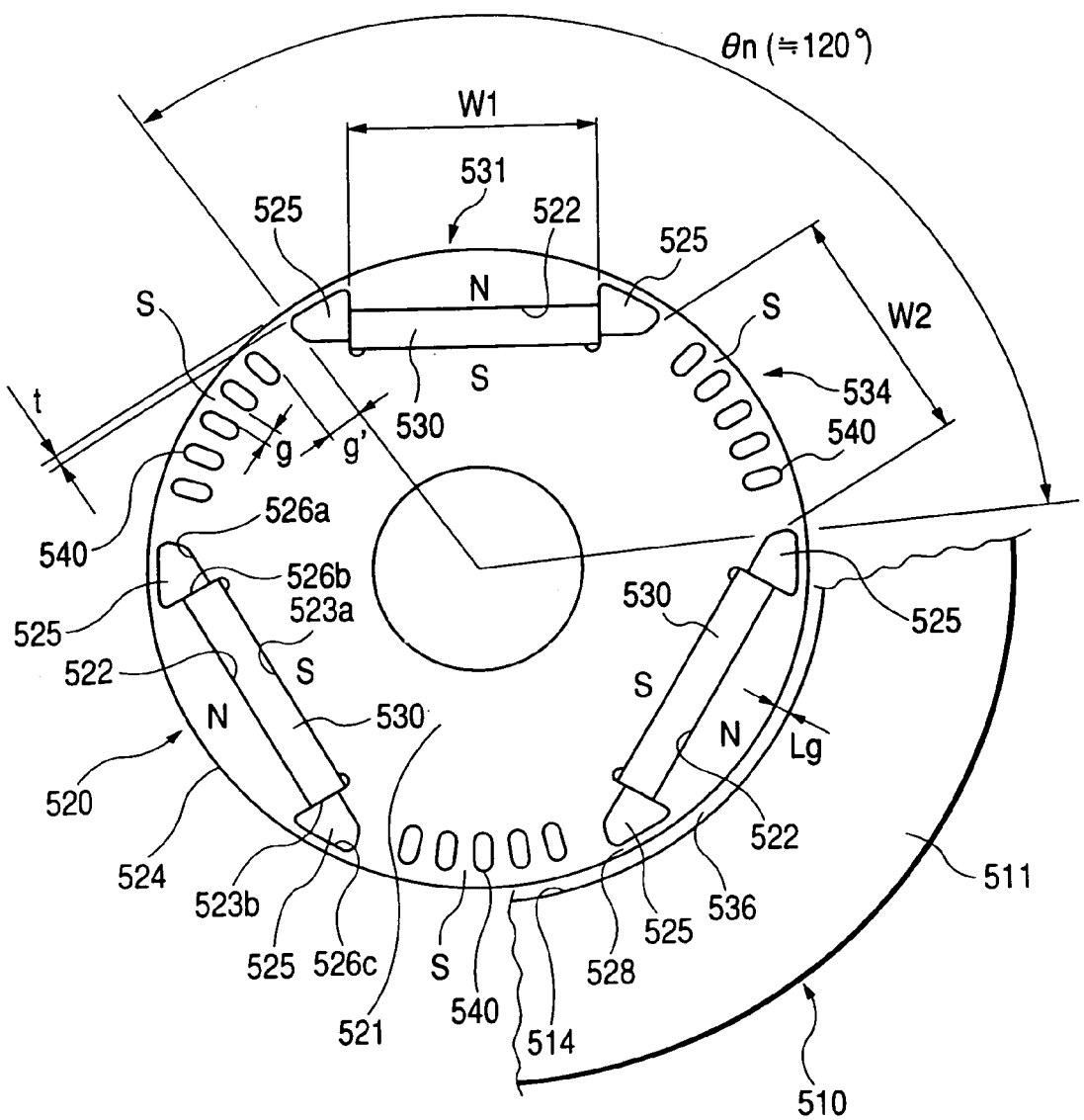
FIG. 17 is a transverse cross-sectional view showing a magnet-saving type rotor of a synchronous motor in accordance with a tenth embodiment of the present invention.

FIG. 17 shows a tenth embodiment of the present invention which is substantially equivalent to the combination of the above-described first embodiment and the above-described sixth embodiment.

More specifically, the rotor 520 includes a rotor core 521 and permanent magnets (i.e., rare-earth magnet) 530. A total of three permanent magnet accommodation holes 522, each extending in the axial direction from one end surface to the other end surface of the rotor core 521, are formed in the rotor core 521 so as to be disposed at predetermined angular pitches in the circumferential direction. When seen in a transverse cross-sectional view, each of the magnet accommodation holes 522 is configured into a flat rectangular shape elongated in a direction perpendicular to the radial direction of the rotor core 521. In other words, each magnet accommodation hole 522 is disposed on a chord of a circle corresponding to the outer cylindrical surface of the rotor core 521.

A pair of vacant holes (i.e., magnet-less holes) 525 is formed continuously at both circumferential ends of an associated magnet accommodation hole 522. A slight stepped portion is provided between the bottom edge of the vacant hole 525 and the radial inner principal plane of, the associated magnet accommodation hole 522. According to this embodiment, a total of three magnet accommodation holes 522 are formed at equal angular pitches 120 (=360/3) degrees.

The cross-sectional shape of each vacant hole 525, taken along a plane normal to the axis of the rotor core 521, is a right angle isosceles triangle. A bottom wall 526a of vacant hole 525 is continuously with the bottom wall 523a of magnet accommodation hole 522 and extends closely to the outer cylindrical surface 524 of the rotor core 521. A side wall 526b of vacant hole 525 agrees with a side wall 523b of magnet accommodation hole 522. A hypotenuse 526c of vacant hole 525 extends along the outer cylindrical surface 524 of the rotor core 521. As a result, a thin bridge 528 having a uniform thickness is formed between each vacant hole 525 and the outer cylindrical surface 524 of the rotor core 521.

A total of three permanent magnets 530, each being configured into a thin rectangular plate shape having an S-pole at a radial inner surface and an N-pole at a radial outer surface, are accommodated in respective magnet accommodation holes 522. A total of three first magnetic pole portions 531, having a first polarity, are formed. In each of the first magnetic pole portions 531, the radial outer region of the rotor core 521 outside the magnet accommodation hole 522 serves as N-pole while the radial inner region of the rotor core 521 inside the magnet accommodation hole 522 serves as S-pole. A total of three second magnetic pole portions 534, having a second polarity, are formed between two adjacent first magnetic pole portions 531. Each of the second magnetic pole portions 534, serving as S-pole, is positioned between any two of the vacant holes 525 arrayed next to each other along the circumferential direction in the outer peripheral region of the rotor core 521.

Furthermore, a circumferential size W1 of the first magnetic pole portion 531 is 1.1 times a circumferential size W2 of the second magnetic pole portion 534. The circumferential size W2 of the second magnetic pole portion 534 is equal to a distance between two vacant holes 525 disposed next to each other at both circumferential ends of the second magnetic pole portion 534.

A gap 536 is provided between an inner cylindrical surface 514 of a stator core 511 of a stator 510 and the outer cylindrical surface 524 of the rotor core 521. The thickness of the gap 536, i.e., the radial size of the gap 536, is constant in the circumferential direction and also in the axial direction and is substantially equal to the thickness of the bridge 528.

As described above, according to this embodiment, the thickness of each bridge 528 is substantially equal to the radial size of gap 536. The circumferential length of the first magnetic pole portion 531 is longer than the circumferential length of the second magnetic pole portion 534.

Furthermore, according to this embodiment, a total of five vacant holes (i.e., magnet-less holes) 540 are formed closely to the outer cylindrical surface 524 of the rotor core 521 so as to be arrayed in the circumferential direction in each second magnetic pole portion 534. A predetermined gap g is provided between two adjacent vacant holes 540. The cross section of respective vacant holes 540 is an elongated shape extending in the radial direction, with a radial size longer than a circumferential size.

Respective vacant holes 540 extend in the axial direction of the rotor core 521. A gap g' is provided between the outermost vacant hole 540 in the second magnetic pole portion 53 and the vacant hole 525 formed continuously with the magnet accommodation hole 522. The gap g' is larger than the above-described gap g. The vacant holes 540 are provided closely to the outer cylindrical surface 524 of the rotor core 521.

According to this embodiment, to assure satisfactory gap magnetic flux density ratio, it is preferable that the ratio t/Lg (i.e., the ratio of the thickness of each bridge to the gap between the rotor core and the stator) is in the range from 0.5 to 3.

In the rotor core 521, it becomes possible to suppress the leakage of magnetic flux via the bridges 528 at both circumferential ends of each magnet accommodation hole 522, because the thickness of bridge 528 is reduced to the level approximately identical with the size of stator/rotor gap 536 so that the magnetic flux flowing across the bridge 528 can be saturated.

It is easy to form the bridges 528 having a desired thickness because a pair of vacant holes 525, each having a cross-sectional shape of a right angle isosceles triangle, is formed continuously with the magnet accommodation hole 522 at both circumferential ends thereof and because the hypotenuse of each vacant hole 525 extends along the outer cylindrical surface 524 of the rotor core 521. The height of side wall 526b of each vacant hole 525, i.e., the radial size of the vacant hole 525, is fairly larger than the height of side wall 523b of the magnet accommodation hole 522. This arrangement brings the effect of suppressing the magnetic flux from leaking into the vacant cavity 525 at both ends of the permanent magnets 530.

The characteristics of the rotor 520 can be improved especially in the balance of magnetic flux amount in the first and second magnetic pole portions 531 and 534 because the circumferential length W1 of the first magnetic pole portion 531 is slightly longer than the circumferential length W2 of the second magnetic pole portion 534.

Eleventh Embodiment

An eleventh embodiment of the present invention is substantially equivalent to the combination of the above-described second embodiment and the above-described sixth embodiment.

In other words, the eleventh embodiment of the present invention is different from the above-described tenth embodiment only in that the vacant holes 540 are provided with a basket type wiring formed by aluminum die-cast. This makes it possible to suppress the generation of induction torque and prevent the motor from going into a disordered or non-synchronous condition.

Twelfth Embodiment

Figure 18:
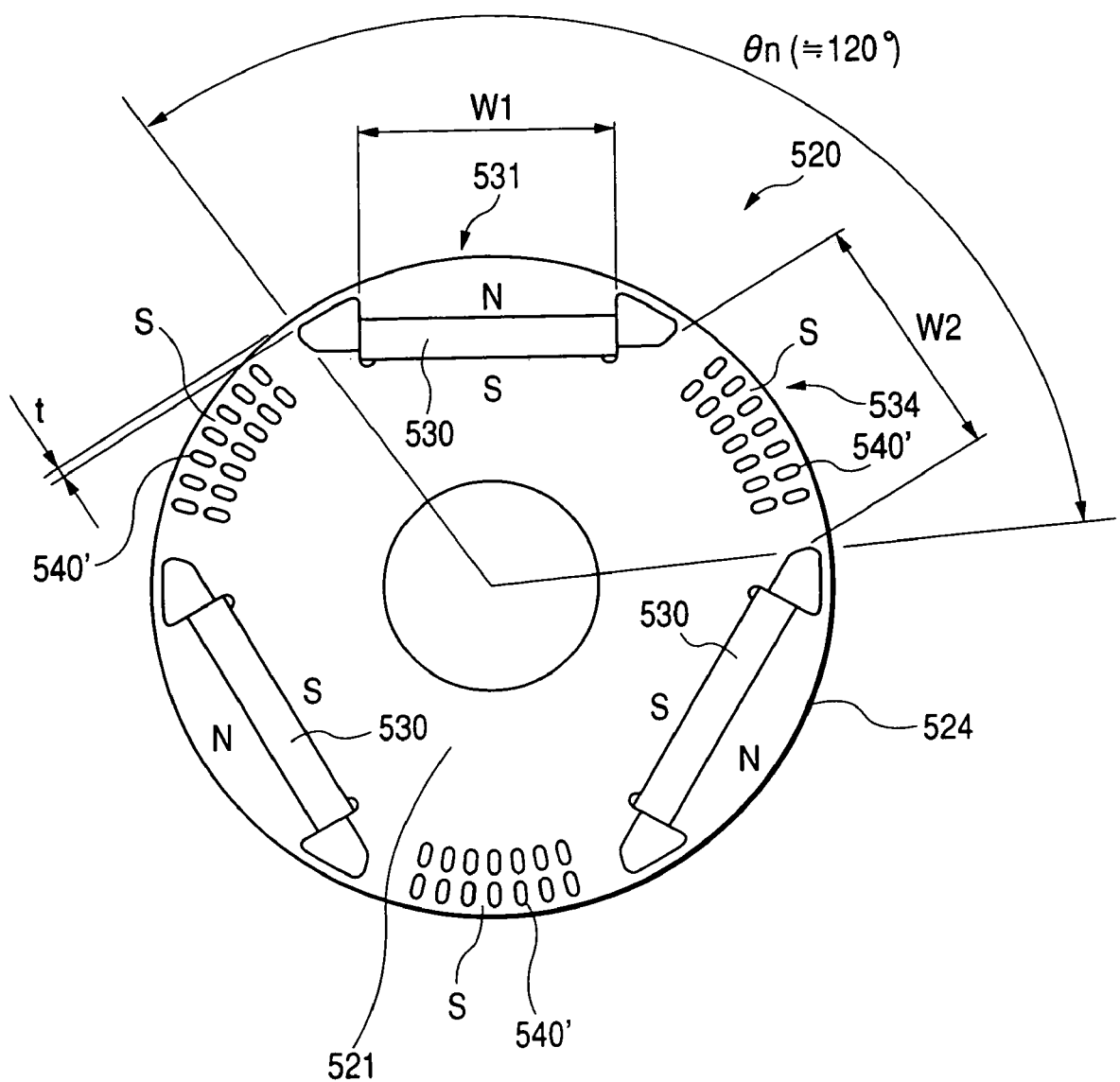
FIG. 18 is a transverse cross-sectional view showing a magnet-saving type rotor of a synchronous motor in accordance with a twelfth embodiment of the present invention.

FIG. 18 shows a twelfth embodiment of the present invention which is substantially equivalent to the combination of the above-described third embodiment and the above-described sixth embodiment.

In other words, the twelfth embodiment of the present invention is different from the above-described tenth embodiment in that vacant holes 540' are arrayed in a predetermined matrix pattern with two lines extending in the radial direction and seven rows extending in the circumferential direction of the rotor core 521. Respective vacant holes 540' extend in the axial direction of the rotor core 521. With this arrangement, both the magnetic path for passing the magnet fluxes and the magnetic path for passing the q-axis current fluxes can be adequately formed.

While the invention has been shown and described in detail, the foregoing description is in all aspects illustrative and not restrictive. It is therefore understood that numerous other modifications and variations can be devised without departing from the scope of the invention.

What is claimed is:

1. A magnet-saving type rotor for a synchronous motor comprising:
    a rotor core, and
    a total of k permanent magnets installed in said rotor core, each of said permanent magnets having a first polarity portion and a second polarity portion,
    wherein said rotor core comprises:
    a total of k magnet accommodation holes, formed in said rotor core closely to an outer cylindrical surface of said rotor core along a circumferential direction of said rotor core, which accommodate said permanent magnets, respectively, so as to direct the first polarity portions of said permanent magnets toward a radial outer side of said rotor core, each of said magnet accommodation holes extending in an axial direction of said rotor core, said magnet accommodation holes being disposed at equal angular pitches of θn equivalent to 360/k degrees,
    a total of 2 k magnet-less holes, respectively, formed at 2 k circumferential ends of said k magnet accommodation holes without accommodating said permanent magnets, each of said magnet-less holes extending in the axial direction of said rotor core;
    a total of k first magnetic pole portions positioned at a radial outer side of said magnet accommodation holes in an outer peripheral region of said rotor core along the circumferential direction of said rotor core and having a first polarity due to the first polarity portions of said permanent magnets; and
    a total of k second magnetic pole portions having a second polarity and positioned at the radial outer side of said rotor core along the circumferential direction of said rotor core, each of said second magnetic pole portions being positioned between two magnet-less holes closest to each other among four magnet-less holes corresponding to two magnet accommodation holes placed next to each other,
    wherein a sector angle occupied by each of said magnet-less holes positioned at both circumferential ends of respective magnet accommodation holes is equal to θ0 equivalent to 0.5(θn−θ1−θ2),
    where θ1 represents a sector angle occupied by each of said first magnetic pole portions, θ2 represents a sector angle occupied by each of said second magnetic pole portions, and θ0 represents a sector angle occupied by each of boundary zones intervening between said first magnetic pole portions and said second magnetic pole portions.

2. The magnet-saving type rotor for a synchronous motor in accordance with claim 1, wherein a ratio (θ0/θn) of the sector angle θ0 to the pitch angle θn is in a range from 0.05 to 0.125.

3. The magnet-saving type rotor for a synchronous motor in accordance with claim 1, wherein a ratio (θ2/θ1) of said sector angle θ2 to said sector angle θ1 is in a range from 0.9 to 1.1.

4. The magnet-saving type rotor for a synchronous motor in accordance with claim 1, wherein said permanent magnets are made of rare-earth magnet.

5. A magnet-saving type rotor for a synchronous motor comprising:
    a rotor core, and
    a total of k permanent magnets installed in said rotor core, each of said permanent magnets having a first polarity portion and a second polarity portion,
    wherein said rotor core comprises:
    a total of k magnet accommodation holes, formed in said rotor core closely to an outer cylindrical surface of said rotor core along a circumferential direction of said rotor core, which accommodate said permanent magnets, respectively, so as to direct the first polarity portions of said permanent magnets toward a radial outer side of said rotor core, each of said magnet accommodation holes extending in an axial direction of said rotor core, said magnet accommodation holes being disposed at equal angular pitches of θn equivalent to 360/k degrees,
    a total of 2 k magnet-less holes, respectively, formed at 2 k circumferential ends of said k magnet accommodation holes without accommodating said permanent magnets, each of said magnet-less holes extending in the axial direction of said rotor core;
    a total of k first magnetic pole portions positioned at a radial outer side of said magnet accommodation holes in an outer peripheral region of said rotor core along the circumferential direction of said rotor core and having a first polarity due to the first polarity portions of said permanent magnets; and
    a total of k second magnetic pole portions having a second polarity and positioned at the radial outer side of said rotor core along the circumferential direction of said rotor core, each of said second magnetic pole portions being positioned between two magnet-less holes closest to each other among four magnet-less holes corresponding to two magnet accommodation holes placed next to each other,
    wherein a ratio (θ2/θ1) of a sector angle θ2 occupied by each of said second magnetic pole portions to a sector angle θ1 occupied by each of said first magnetic pole portions is in a range from 0.9 to 1.1, and
    a sector angle θ0 occupied by each of boundary zones intervening between said first magnetic pole portions and said second magnetic pole portions is expressed by 0.5(θn−θ1−θ2).

6. The magnet-saving type rotor for a synchronous motor in accordance with claim 5, wherein said sector angle θ0 is equal to a sector angle occupied by each of said magnet-less holes positioned at both circumferential ends of respective magnet accommodation holes.

7. The magnet-saving type rotor for a synchronous motor in accordance with claim 5, wherein a ratio (θ0/θn) of the sector angle θ0 to the pitch angle θn is in a range from 0.05 to 0.125.

8. The magnet-saving type rotor for a synchronous motor in accordance with claim 5, wherein said permanent magnets are made of rare-earth magnet.

9. A magnet-saving type rotor for a synchronous motor comprising:
   a rotor core, and
   a total of k permanent magnets installed in said rotor core, each of said permanent magnets having a first polarity portion and a second polarity portion,
   wherein said rotor core comprises:
   a total of k magnet accommodation holes, formed in said rotor core closely to an outer cylindrical surface of said rotor core along a circumferential direction of said rotor core, which accommodate said permanent magnets, respectively, so as to direct the first polarity portions of said permanent magnets toward a radial outer side of said rotor core, each of said magnet accommodation holes extending in an axial direction of said rotor core, said magnet accommodation holes being disposed at equal angular pitches of $\theta n$ equivalent to $360/k$ degrees,
   a total of 2k first magnet-less holes, respectively, formed at 2k circumferential ends of said k magnet accommodation holes for without accommodating said permanent magnets, each of said magnet-less holes extending in the axial direction of said rotor core;
   a total of k first magnetic pole portions positioned at a radial outer side of said magnet accommodation holes in an outer peripheral region of said rotor core along the circumferential direction of said rotor core and having a first polarity due to the first polarity portions of said permanent magnets;
   a total of k second magnetic pole portions having a second polarity and positioned at the radial outer side of said rotor core along the circumferential direction of said rotor core, each of said second magnetic pole portions being positioned between two magnet-less holes closest to each other among four magnet-less holes corresponding to two magnet accommodation holes placed next to each other; and
   a plurality of second magnet-less holes formed in said second magnetic pole portions so as to extend in the axial direction in the vicinity of said outer cylindrical surface of the rotor core, no conductors being disposed in said second magnet-less holes,
   wherein a sector angle occupied by each of said first magnet-less holes positioned continuously at both circumferential ends of respective magnet accommodation holes is equal to $\theta 0$ equivalent to $0.5(\theta n - \theta 1 - \theta 2)$, where $\theta 1$ represents a sector angle occupied by each of said first magnetic pole portions, $\theta 2$ represents a sector angle occupied by each of said second magnetic pole portions, and $\theta 0$ represents a sector angle occupied by each of boundary zones intervening between said first magnetic pole portions and said second magnetic pole portions.

10. The magnet-saving type rotor for a synchronous motor in accordance with claim 9, wherein said permanent magnets are made of rare-earth magnet.

11. The magnet-saving type rotor for a synchronous motor in accordance with claim 9, wherein the ratio ($\theta 2/\theta 1$) of the sector angle $\theta 2$ occupied by each of the second magnetic pole portions to the sector angle $\theta 1$ occupied by each of the first magnetic pole portions is in the range from 0.9 to 1.1.

12. The magnet-saving type rotor for a synchronous motor in accordance with claim 9, wherein a ratio ($\theta 0/\theta n$) of the sector angle $\theta 0$ occupied by each of boundary zones to the pitch angle $\theta n$ is in the range from 0.05 to 0.125.

13. The magnet-saving type rotor for a synchronous motor in accordance with claim 9, wherein each of said second magnet-less holes has an elongated cross-sectional shape with a radial size longer than a circumferential size.

14. The magnet-saving type rotor for a synchronous motor in accordance with claim 9, wherein said second magnet-less holes accommodate a basket-type wiring.

15. The magnet-saving type rotor for a synchronous motor in accordance with claim 9, wherein said second magnet-less holes are arrayed in a predetermined matrix pattern with a plurality of lines and rows extending in the circumferential direction and the radial direction.

16. The magnet-saving type rotor in accordance with claim 9, wherein said second magnet-less holes are arrayed along the circumferential direction of said rotor core so as to suppress reduction of q-axis current magnetic flux necessary to produce a reluctance torque and to reduce an invalid magnetic flux.

* * * * *